United States Patent
Zhou et al.

(10) Patent No.: US 9,219,536 B2
(45) Date of Patent: Dec. 22, 2015

(54) RADIO COMMUNICATION SYSTEM AND RADIO COMMUNICATION METHOD

(71) Applicant: FUJITSU LIMITED, Kawasaki-shi, Kanagawa (JP)

(72) Inventors: Liang Zhou, Kawasaki (JP); Yoji Ohashi, Fucyu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/446,162

(22) Filed: Jul. 29, 2014

(65) Prior Publication Data
US 2015/0063482 A1    Mar. 5, 2015

(30) Foreign Application Priority Data

Sep. 4, 2013   (JP) .................................. 2013-183277
Feb. 20, 2014  (JP) .................................. 2014-030727

(51) Int. Cl.
*H04B 7/04*    (2006.01)

(52) U.S. Cl.
CPC ............ *H04B 7/0482* (2013.01); *H04B 7/0413* (2013.01)

(58) Field of Classification Search
CPC ........ H04B 7/043; H04B 7/0482; H04B 1/10; H04B 1/16; H04B 7/0667; H04L 25/022; H04L 25/0224; H04L 25/03159; H04L 27/2647; H04L 1/0606; H04L 1/0637; H04L 25/0204; H04L 25/0244; H04L 25/03012
See application file for complete search history.

(56) References Cited

U.S. PATENT DOCUMENTS

| | | | |
|---|---|---|---|
| 7,149,239 B2* | 12/2006 | Hudson ........................ | 375/144 |
| 7,450,532 B2 | 11/2008 | Chae et al. | |
| 8,351,524 B2 | 1/2013 | Zhou | |
| 8,571,125 B2 | 10/2013 | Maru | |
| 8,665,693 B1* | 3/2014 | Cheng et al. .................. | 370/204 |
| 8,675,512 B2* | 3/2014 | Suzuki et al. ................. | 370/252 |
| 8,693,970 B2* | 4/2014 | Corman et al. ............ | 455/276.1 |
| 2004/0157646 A1* | 8/2004 | Raleigh et al. ............ | 455/562.1 |
| 2005/0195915 A1* | 9/2005 | Raleigh et al. ................ | 375/267 |
| 2005/0201307 A1 | 9/2005 | Chae et al. | |
| 2006/0109891 A1 | 5/2006 | Guo et al. | |
| 2006/0109897 A1 | 5/2006 | Guo et al. | |
| 2006/0120477 A1 | 6/2006 | Shen et al. | |
| 2006/0245477 A1 | 11/2006 | Yoshida | |
| 2007/0058081 A1 | 3/2007 | Kim et al. | |
| 2007/0110127 A1 | 5/2007 | Mergen et al. | |

(Continued)

FOREIGN PATENT DOCUMENTS

| | | |
|---|---|---|
| JP | H07-86972 A | 3/1995 |
| JP | 2001-060897 A | 3/2001 |

(Continued)

OTHER PUBLICATIONS

Clark, et al., "A Unified Approach to Time- and Frequency-Domain Realization of FIR Adaptive Digital Filters", IEEE Transactions on Acoustics, Speech, and Signal Processing, vol. 31, No. 5, pp. 1073-1083, Oct. 1983.

(Continued)

*Primary Examiner* — Hirdepal Singh
(74) *Attorney, Agent, or Firm* — Arent Fox LLP

(57) ABSTRACT

In a radio communication system, a plurality of transmission antennas and a plurality of reception antennas are arranged such that a channel matrix having channel responses between the plurality of transmission antennas and the plurality of reception antennas as elements is a circulant matrix.

25 Claims, 23 Drawing Sheets

(56) References Cited

U.S. PATENT DOCUMENTS

| | | | |
|---|---|---|---|
| 2007/0121747 A1 | 5/2007 | Zeira | |
| 2007/0211811 A1 | 9/2007 | Subramaniam et al. | |
| 2008/0137723 A1 | 6/2008 | Liu | |
| 2009/0103413 A1 | 4/2009 | Matsui et al. | |
| 2009/0184879 A1 | 7/2009 | Derneryd et al. | |
| 2009/0213969 A1* | 8/2009 | Hasegawa et al. | 375/343 |
| 2009/0285325 A1 | 11/2009 | Zhou | |
| 2010/0135203 A1 | 6/2010 | Maru | |
| 2010/0232529 A1 | 9/2010 | Fettweis et al. | |
| 2012/0172096 A1* | 7/2012 | Samardzija et al. | 455/575.7 |
| 2013/0321207 A1* | 12/2013 | Monogioudis et al. | 342/373 |
| 2013/0336152 A1* | 12/2013 | Zhu et al. | 370/252 |
| 2015/0045091 A1* | 2/2015 | Nakatani | 455/556.1 |

FOREIGN PATENT DOCUMENTS

| | | |
|---|---|---|
| JP | 2006-506906 A | 2/2006 |
| JP | 2006-246128 A | 9/2006 |
| JP | 2006-311083 A | 11/2006 |
| JP | 2007-512760 A | 5/2007 |
| JP | 2008-523665 A | 7/2008 |
| JP | 2009-535870 A | 10/2009 |
| JP | 2010-226713 A | 10/2010 |
| WO | WO 2008/062587 A1 | 5/2008 |
| WO | WO 2009/017230 A1 | 2/2009 |

OTHER PUBLICATIONS

European Search Report mailed Jul. 25, 2013 for corresponding European Patent Application No. 08168375.7.

Guo, et al: "Efficient MIMO equalization for downlink multi-code CDMA: complexity optimization and comparative study", Global Telecomunications Conference, 2004. Globecom '04, Nov. 29-Dec. 3, 2004, IEEE, vol. 4, pp. 2513-2519, XP010757980, DOI 10.1109/GLOCOM.2004. 1378459 ISBN: 978-0-7803-8794-2 Nov. 29, 2004.

Haykin, "Adaptive filter theory, (3rd ed.)" Prentice Hall Information and System Sciences Series, Prentice Hall, Inc., 998 pp. Dec. 27, 1995.

Japanese Office Action mailed Apr. 24, 2012 for corresponding Japanese Patent Application No. 2008-046794, with partial English translation of the relevant part.

Japanese Office Action mailed Oct. 2, 2012 for corresponding Japanese Patent Application No. 2008-046794, with partial English translation of the relevant part.

Strang, "A Proposal for Toeplitz Matrix Calculations", Studies in Applied Mathematics vol. 74, No. 2, pp. 171-176, XP055071649, Apr. 1, 1986.

Tech I "Simulation-based digital signal processing", CQ Publishing Co., Ltd., vol. 9, pp. 46-49, Jul. 1, 2001.

United States Office Action mailed Feb. 27, 2012 for corresponding U.S. Appl. No. 12/262,395.

United States Office Action mailed Oct. 18, 2012 for corresponding U.S. Appl. No. 12/262,395.

United States Office Action mailed Sep. 21, 2011 for corresponding U.S. Appl. No. 12/262,395.

Zhang, et al: "Efficient linear equalization for high data rate downlink CDMA signaling", Conference Record of the 37th Asilomar Conference on Signals, Systems, & Computers, Pacific Grove, CA Nov. 9-12, 2003, IEEE, vol. 1, pp. 141-145, XP010701443, DOI: 10.1109/ACSSC.2003.1291886 ISBN: 978-0-7803-8104-9 Nov. 9, 2003.

* cited by examiner

RADIO COMMUNICATION SYSTEM AND RADIO COMMUNICATION METHOD

CROSS-REFERENCE TO RELATED APPLICATIONS

This application is based upon and claims the benefit of priority of the prior Japanese Patent application No. 2014-030727, filed on Feb. 20, 2014, and the prior Japanese Patent application No. 2013-183277, filed on Sep. 4, 2013, the entire contents of which are incorporated herein by reference.

FIELD

The present invention relates to a radio communication system and a radio communication method.

BACKGROUND

A radio communication system using a Multiple Input and Multiple Output (MIMO) scheme has been known. In the MIMO scheme, there are cases in which communication by an eigenmode is performed between a plurality of transmission antennas and a plurality of reception antennas (e.g., see WO 2009/017230 A, JP 2007-512760 W, WO 2008/062587 A, JP 2009-535870 W, JP 2005-510928 W, JP 2008-523665 W, JP 2006-506906 W, and JP 2010-226713 A).

A relation among a radio signal (a transmission signal) x transmitted by a transmission antenna, a radio signal (a reception signal) y received by a reception antenna, and a noise n included in the reception signal y is represented as in Mathematical Formula 1:

$$y = Hx + n \quad \text{[Mathematical Formula 1]}$$

Here, x represents a vector (transmission signal vector) of $Nt \times 1$. Nt represents the number of transmission antennas. n represents a vector (a noise vector) of $Nr \times 1$. Nr represents the number of reception antennas. y represents a vector (reception signal vector) of $Nr \times 1$. H represents a matrix (a channel matrix) of $Nr \times Nt$. A channel matrix is a matrix having a channel response (channel impulse response) between an i-th reception antenna and a j-th transmission antenna as an element of an i-th row and a j-th column. i represents an integer from 1 to Nr. j represents an integer from 1 to Nt.

A channel matrix H is expressed as a multiplication of three matrices as in Mathematical Formula 2 as a singular value decomposition (SVD) is performed.

$$H = UDV^H \quad \text{[Mathematical Formula 2]}$$

Here, U represents a left singular matrix. V represents a right singular matrix. $V^H$ represents a complex conjugate transposed matrix of V. D represents a diagonal matrix as in Mathematical Formula 3.

$$D = \text{diag}(\sqrt{\lambda_1}, \sqrt{\lambda_2}, \ldots, \sqrt{\lambda_m}) \quad \text{[Mathematical Formula 3]}$$

Here, $\lambda_i$ represents an eigenvalue of a matrix $H^H H$ or a matrix $HH^H$. Here, the number Nt of transmission antennas is assumed to be equal to the number Nr of reception antennas. m represents the number Nt of transmission antennas (or the number Nr of reception antennas). i represents an integer from 1 to m. $\lambda_i$ is in proportion to a gain when communication (eigenmode communication) is performed in an eigenmode.

A case in which the transmission signal x acquired by pre-multiplying a pre-process signal s by the right singular matrix V has been transmitted is assumed. The transmission signal x is expressed as in Mathematical Formula 4. In this case, the reception signal y is expressed as in Mathematical Formula 5 derived by substituting Mathematical Formula 4 into Mathematical Formula 1.

$$x = Vs \quad \text{[Mathematical Formula 4]}$$

$$y = HVs + n \quad \text{[Mathematical Formula 5]}$$

Further, when a post-process signal z is a signal acquired by pre-multiplying the reception signal y by a complex conjugate transposed matrix $U^H$ of the left singular matrix U, the post-process signal z is expressed as in Mathematical Formula 6. Mathematical Formula 6 represents that no interference occurs between channels. In other words, Mathematical Formula 6 represents that communication can be performed in an eigenmode. Here, n' represents a vector acquired by pre-multiplying a noise vector n by the complex conjugate transposed matrix $U^H$ of the left singular matrix U.

$$z = U^H y = U^H HVs + U^H n = Ds + n' \quad \text{[Mathematical Formula 6]}$$

In a radio communication system, when communication is performed in an eigenmode, a reception side estimates the channel matrix H based on channel state information (CSI). It is possible to estimate the right singular matrix V and the left singular matrix U by performing the singular value decomposition on the estimated channel matrix H. The reception side transfers the estimated right singular matrix V to the transmission side. The transmission side pre-multiplies the pre-process signal s by the right singular matrix V as a transmission weight matrix, and transmits the pre-multiplied signal as the transmission signal x.

The reception side pre-multiplies the received reception signal y by the complex conjugate transposed matrix $U^H$ of the left singular matrix U as a reception weight matrix, and acquires the pre-multiplied signal as the post-process signal z. Through the above-described operation, the radio communication system of the MIMO scheme performs communication in the eigenmode, and thus reduces interference between channels and increases a channel capacity.

SUMMARY

In the MIMO communication in the eigenmode, since the singular value decomposition is performed and the right singular matrix V is transferred from the reception side to the transmission side, a communication process is complicated.

In a radio communication system according to an aspect, a plurality of transmission antennas and a plurality of reception antennas are arranged such that a channel matrix H having channel responses between the plurality of transmission antennas and the plurality of reception antennas as elements is a circulant matrix.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, exemplary embodiments of a radio communication system, a radio communication method, a transmission device, and a reception device will be described with reference to FIG. 1 to FIG. 23. Here, the following embodiments are merely examples, and not intended to exclude the application of various kinds of modifications or techniques that are not set forth below.

First Embodiment

Outline

A radio communication system according to a first embodiment includes a plurality of transmission antennas and a plurality of reception antennas. In the radio communication system, signals are wirelessly transmitted from a plurality of transmission antennas to a plurality of reception antennas. The plurality of transmission antennas and the plurality of reception antennas are arranged such that a channel matrix having channel responses between the transmission antennas and the reception antennas as elements is a circulant matrix.

Accordingly, a communication process can be simplified.

Hereinafter, the radio communication system according to the first embodiment will be described in detail.

Configuration

Figure 1:
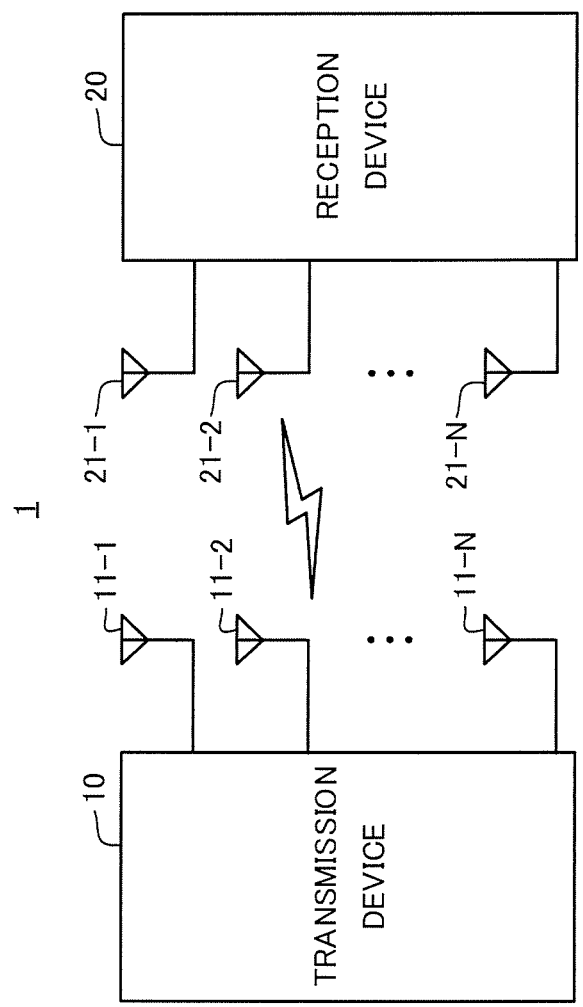
FIG. 1 is a view illustrating an example of a schematic configuration of a radio communication system according to a first embodiment.

A radio communication system 1 according to the first embodiment includes a transmission device 10 and a reception device 20 as illustrated in FIG. 1.

The transmission device 10 includes a plurality of (N, in this example) transmission antennas 11-1, 11-2, . . . , and 11-N. Here, N represents the number of antennas, and an integer of 2 or more. The transmission device 10 wirelessly transmits signals through the plurality of transmission antennas 11. The transmission antenna 11-$i$ (here, i represents an integer from 1 to N) is referred to simply as a "transmission antenna 11" when the transmission antennas need not be distinguished from each other.

The reception device 20 includes a plurality of (N, in this example) reception antennas 21-1, 21-2, . . . , and 21-N. In this example, the number of the transmission antennas 11-1, 11-2, . . . , and 11-N is equal to the number of the reception antennas 21-1, 21-2, . . . , and 21-N. The reception antenna 21-$i$ (here, i represents an integer from 1 to N) is referred to simply as a "reception antenna 21" when the reception antennas need not be distinguished from each other. The reception device 20 receives the signals, which are transmitted from the plurality of transmission antennas 11, through the plurality of reception antennas 21.

Figure 2:
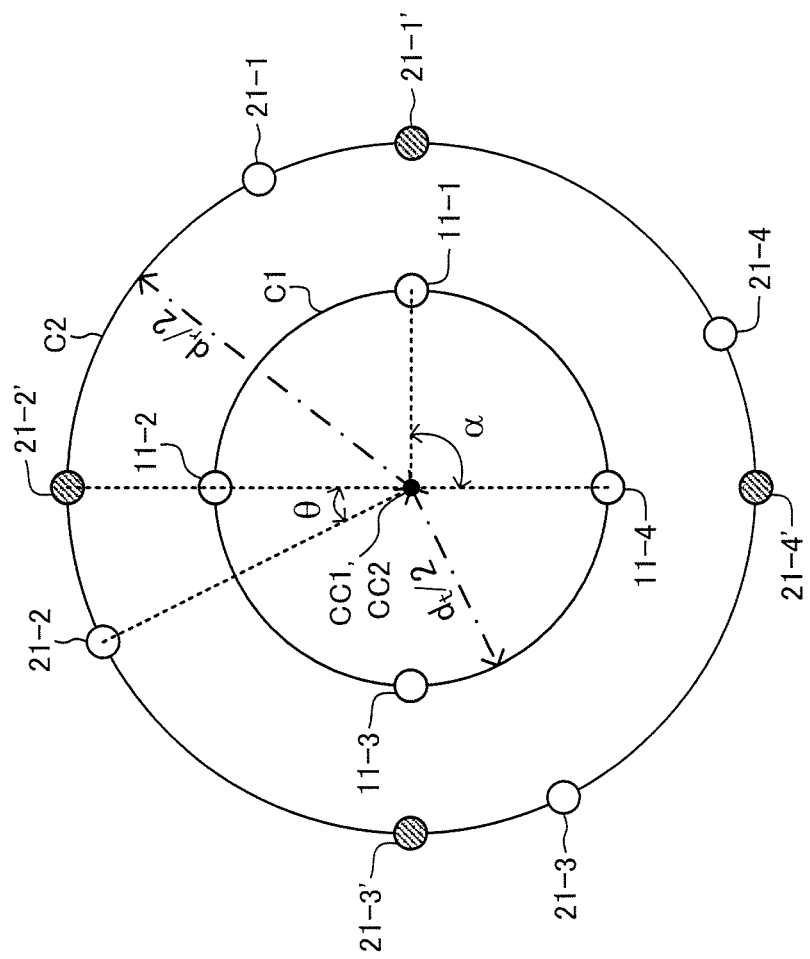
FIG. 2 is a front view illustrating an example of a spatial arrangement (positional relation) of antennas according to the first embodiment.
Figure 3:
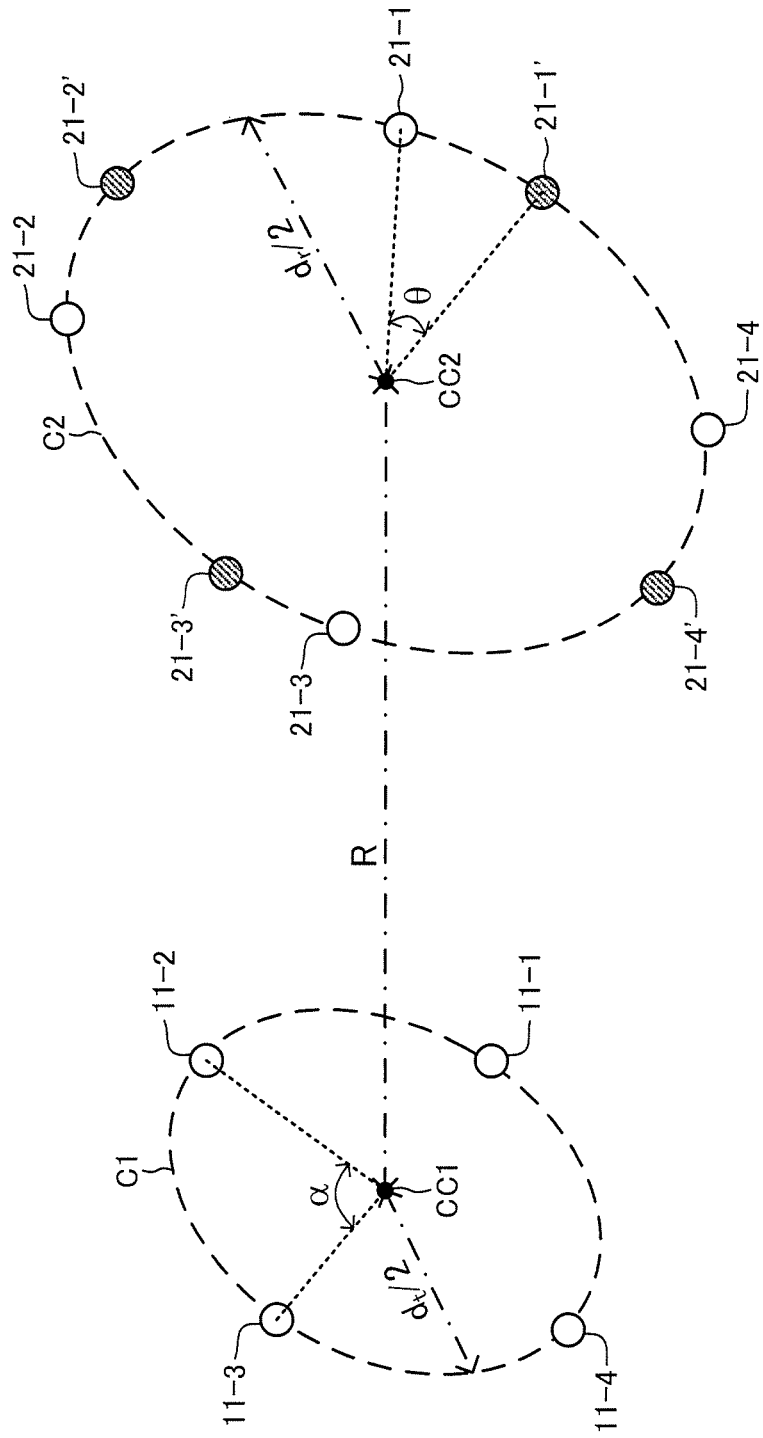
FIG. 3 is an explanatory view schematically illustrating an example of a spatial arrangement (positional relation) of antennas according to the first embodiment.

FIG. 2 is a front view illustrating an example of a spatial arrangement (a positional relation) of the plurality of transmission antennas 11-1, 11-2, . . . , and 11-N and the plurality of reception antennas 21-1, 21-2, . . . , and 21-N. FIG. 3 is an explanatory view schematically illustrating an example of the positional relation illustrated in FIG. 2. In FIGS. 2 and 3, the number N of antennas is assumed to be 4 as an example.

The plurality of transmission antennas 11-1, 11-2, . . . , and 11-N are arranged on the circumference of a first circle C1 at equal intervals as illustrated in FIGS. 2 and 3. A central angle $\alpha$ between the transmission antennas 11 adjacent to each other on the circumference is expressed as in Mathematical Formula 7. In other words, when the number N of antennas is 4, the central angle $\alpha$ is $\pi/2$.

$$\alpha = \frac{2\pi}{N} \qquad \text{[Mathematical Formula 7]}$$

Similarly, the plurality of reception antennas 21-1, 21-2, . . . , and 21-N are arranged on the circumference of a second circle C2 at equal intervals. The second circle C2 is parallel to the first circle C1. In other words, a first plane on which the first circle C1 is defined is parallel to a second plane on which a second circle C2 is defined. In addition, the second circle C2 is concentric to the first circle C1. In other words, a center CC2 of the second circle C2 is positioned on a straight line that passes through a center CC1 of the first circle C1 and is perpendicular to the first circle C1 (in other words, the first plane).

In this example, the center CC1 of the first circle C1 is positioned away from the center CC2 of the second circle C2 by a distance (in other words, inter-center distance) R. In FIGS. 2 and 3, a diameter $d_r$ of the second circle C2 is assumed to be larger than a diameter $d_t$ of the first circle C1 as an example. The diameter $d_t$ of the first circle C1 may be larger than the diameter $d_r$ of the second circle C2, or the diameter $d_t$ of the first circle C1 may be equal to the diameter $d_r$ of the second circle C2.

In other words, FIG. 2 is a view illustrating an example of the plurality of transmission antennas 11-1, 11-2, . . . , and 11-N and the plurality of reception antennas 21-1, 21-2, . . . , and 21-N viewed in a direction along the straight line passing through the center CC1 of the first circle C1 and the center CC2 of the second circle C2.

The reception antenna 21-i is arranged at the position rotated from a certain reference position 21-i' by an offset angle θ, relative to the corresponding transmission antenna 11-i. The reference position 21-i' is the position at which a straight line, which connects the position at which a straight line passing through the transmission antenna 11-i and being perpendicular to the first circle C1 (in other words, the first plane) crosses the second plane with the center CC2 of the second circle C2, crosses the circumference of the second circle C2. For example, when the diameter $d_t$ of the first circle C1 is equal to the diameter $d_r$ of the second circle C2, the reference position 21-i' is the position at which a straight line passing through the transmission antenna 11-i and being perpendicular to the first circle C1 crosses the second plane. The offset angle θ may be a positive value or a negative value or may be 0°.

A relative rotation angle $\phi_{m,n}$ between an m-th reception antenna 21-m and an n-th transmission antenna 11-n is expressed as in Mathematical Formula 8. Here, m and n are integers from 1 to N, respectively.

$$\phi_{m,n} = \alpha(m-n)+\theta \qquad \text{[Mathematical Formula 8]}$$

A distance (the inter-antenna distance) $r_{mn}$ between the m-th reception antenna 21-m and the n-th transmission antenna 11-n is expressed as in Mathematical Formula 9.

$$r_{mn} = \sqrt{R^2 + (d_t/2)^2 + (d_r/2)^2 - 2(d_t/2)(d_r/2)\cos(\phi_{m,n})}$$
$$= \sqrt{R^2 + (d_t^2 + d_r^2 - 2d_t d_r \cos(\phi_{m,n}))/4}$$
[Mathematical Formula 9]

$$= R\sqrt{1 + \left(\frac{d_t^2 + d_r^2 - 2d_t d_r \cos(\phi_{m,n})}{}\right)/(4R^2)}$$

Here, a representative diameter d is defined as in Mathematical Formula 10. Further, using a relation expressed in Mathematical Formula 11 that is held when x is sufficiently small, Mathematical Formula 12 is derived from Mathematical Formula 9.

$$d^2 = \frac{d_t^2 + d_r^2}{2} \qquad \text{[Mathematical Formula 10]}$$

$$\sqrt{1+x} \approx 1 + \frac{x}{2} \qquad \text{[Mathematical Formula 11]}$$

$$r_{mn} \approx \qquad \text{[Mathematical Formula 12]}$$
$$R\{1 + (d_t^2 + d_r^2 - 2d_t d_r \cos(\phi_{m,n}))/(8R^2)\} =$$
$$R + \frac{d_t^2 + d_r^2 - 2d_t d_r \cos(\phi_{m,n})}{8R} =$$
$$R + \frac{2d^2 - 2d_t d_r \cos(\phi_{m,n})}{8R}$$

Meanwhile, Mathematical Formula 13 is derived from Mathematical Formula 7 and Mathematical Formula 8.

$$\cos(\phi_{m,n}) = \cos\left(\frac{2\pi}{N}(m-n) + \theta\right) \qquad \text{[Mathematical Formula 13]}$$
$$= \cos\left(\frac{2\pi}{N}(N + (m-n)) + \theta\right)$$
$$= \cos\left(\frac{2\pi}{N}(-N + (m-n)) + \theta\right)$$

As can be understood from Mathematical Formula 12 and Mathematical Formula 13, the inter-antenna distance $r_{mn}$ changes depending on a value (m−n). Thus, for the inter-antenna distance $r_{mn}$, when each of p and q is an integer from 1 to N−1, a relation expressed by Mathematical Formula 14 is satisfied when a condition expressed by Mathematical Formula 15 is satisfied. Further, for the inter-antenna distance $r_{mn}$, when p is an integer from 1 to N−1 and q is N, the relation expressed by Mathematical Formula 14 is satisfied when a condition expressed by Mathematical Formula 16 is satisfied. Thus, a matrix having the inter-antenna distance $r_{mn}$ as an element of an m-th row and an n-th column is a circulant matrix for an arbitrary number N of antennas.

$$r_{pq} = r_{kl} \qquad \text{[Mathematical Formula 14]}$$

$$\begin{cases} k = p+1 \\ l = q+1 \end{cases} \qquad \text{[Mathematical Formula 15]}$$

$$\begin{cases} k = p+1 \\ l = N \end{cases} \qquad \text{[Mathematical Formula 16]}$$

For example, when the number N of antennas is 4, the inter-antenna distance $r_{mn}$ is expressed as in Mathematical Formula 17.

$$r_{11} = R + \frac{2d^2 - 2d_t d_r \cos(\theta)}{8R},$$

$$r_{12} = R + \frac{2d^2 - 2d_t d_r \cos(-\alpha + \theta)}{8R},$$

$$r_{13} = R + \frac{2d^2 - 2d_t d_r \cos(-2\alpha + \theta)}{8R},$$

$$r_{14} = R + \frac{2d^2 - 2d_t d_r \cos(-3\alpha + \theta)}{8R},$$

$$r_{21} = R + \frac{2d^2 - 2d_t d_r \cos(\alpha + \theta)}{8R},$$

$$r_{22} = R + \frac{2d^2 - 2d_t d_r \cos(\theta)}{8R},$$

$$r_{23} = R + \frac{2d^2 - 2d_t d_r \cos(-\alpha + \theta)}{8R},$$

$$r_{24} = R + \frac{2d^2 - 2d_t d_r \cos(-2\alpha + \theta)}{8R},$$

$$r_{31} = R + \frac{2d^2 - 2d_t d_r \cos(2\alpha + \theta)}{8R},$$

$$r_{32} = R + \frac{2d^2 - 2d_t d_r \cos(\alpha + \theta)}{8R},$$

$$r_{33} = R + \frac{2d^2 - 2d_t d_r \cos(\theta)}{8R},$$

$$r_{34} = R + \frac{2d^2 - 2d_t d_r \cos(-\alpha + \theta)}{8R},$$

$$r_{41} = R + \frac{2d^2 - 2d_t d_r \cos(3\alpha + \theta)}{8R},$$

$$r_{42} = R + \frac{2d^2 - 2d_t d_r \cos(2\alpha + \theta)}{8R},$$

$$r_{43} = R + \frac{2d^2 - 2d_t d_r \cos(\alpha + \theta)}{8R},$$

$$r_{44} = R + \frac{2d^2 - 2d_t d_r \cos(\theta)}{8R}$$

[Mathematical Formula 17]

Here, since a relation expressed by Mathematical Formula 18 is satisfied, Mathematical Formula 19 is derived from Mathematical Formula 17.

$$\cos(-3\alpha + \theta) = \cos(\alpha - 2\pi + \theta) = \cos(\alpha + \theta)$$
$$\cos(-2\alpha + \theta) =$$
$$\cos(2\alpha - 2\pi + \theta) = \cos(2\alpha + \theta)$$
$$\cos(3\alpha + \theta) = \cos(2\pi - \alpha + \theta) = \cos(-\alpha + \theta)$$

[Mathematical Formula 18]

$$r_{11} = R + \frac{2d^2 - 2d_t d_r \cos(\theta)}{8R},$$

$$r_{12} = R + \frac{2d^2 - 2d_t d_r \cos(-\alpha + \theta)}{8R}$$

$$r_{13} = R + \frac{2d^2 - 2d_t d_r \cos(2\alpha + \theta)}{8R},$$

$$r_{14} = R + \frac{2d^2 - 2d_t d_r \cos(\alpha + \theta)}{8R}$$

$$r_{21} = R + \frac{2d^2 - 2d_t d_r \cos(\alpha + \theta)}{8R},$$

$$r_{22} = R + \frac{2d^2 - 2d_t d_r \cos(\theta)}{8R}$$

$$r_{23} = R + \frac{2d^2 - 2d_t d_r \cos(-\alpha + \theta)}{8R},$$

$$r_{24} = R + \frac{2d^2 - 2d_t d_r \cos(2\alpha + \theta)}{8R}$$

$$r_{31} = R + \frac{2d^2 - 2d_t d_r \cos(2\alpha + \theta)}{8R},$$

$$r_{32} = R + \frac{2d^2 - 2d_t d_r \cos(\alpha + \theta)}{8R}$$

$$r_{33} = R + \frac{2d^2 - 2d_t d_r \cos(\theta)}{8R},$$

$$r_{34} = R + \frac{2d^2 - 2d_t d_r \cos(-\alpha + \theta)}{8R}$$

$$r_{41} = R + \frac{2d^2 - 2d_t d_r \cos(-\alpha + \theta)}{8R},$$

$$r_{42} = R + \frac{2d^2 - 2d_t d_r \cos(2\alpha + \theta)}{8R}$$

$$r_{43} = R + \frac{2d^2 - 2d_t d_r \cos(\alpha + \theta)}{8R},$$

$$r_{44} = R + \frac{2d^2 - 2d_t d_r \cos(\theta)}{8R}$$

[Mathematical Formula 19]

Communication in a line of sight (LOS) is assumed. In this case, a channel response $h_{mn}$ between the m-th reception antenna 21-$m$ and the n-th transmission antenna 11-$n$ is expressed as in Mathematical Formula 20. Here, j represents an imaginary unit, and $\lambda$ represents a wavelength (in other words, carrier wave wavelength) of a carrier wave of signals transmitted from the plurality of transmission antennas 11.

$$h_{mn} = \exp\left(-j\frac{2\pi}{\lambda} r_{mn}\right)$$

[Mathematical Formula 20]

As can be understood from Mathematical Formula 20, the channel response $h_{mn}$ changes depending on the inter-antenna distance $r_{mn}$. Thus, a channel matrix $H_{cir}$ having the channel response $h_{mn}$ as an element of an m-th row and an n-th column is a circulant matrix. Further, even when the number N of antennas is not 4, the channel matrix $H_{cir}$ is similarly a circulant matrix.

In other words, as described above, in the radio communication system 1, the plurality of transmission antennas 11 and the plurality of reception antennas 21 are arranged such that the channel matrix $H_{cir}$ is a circulant matrix. Here, the element (in other words, the channel response) $h_{mn}$ of the channel matrix $H_{cir}$ is determined in advance based on the inter-antenna distance $r_{mn}$ between the m-th reception antenna 21-$m$ and the n-th transmission antenna 11-$n$. In other words, the channel response $h_{mn}$ is determined based on the inter-antenna distance $r_{mn}$ before communication is performed.

As an example, when the number N of antennas is 4 and the diameter $d_t$ of the first circle C1 is equal to the diameter $d_r$ of the second circle C2, the channel matrix $H_{cir}$ is expressed as in Mathematical Formula 21.

$$H_{cir} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

$$= e^{-j\frac{2\pi R}{\lambda}} \begin{bmatrix} e^{-j\frac{2\pi}{\lambda}\frac{d^2}{2R}\sin^2(\theta/2)} & e^{-j\frac{2\pi}{\lambda}\frac{d^2}{2R}\sin^2((-\alpha+\theta)/2)} & e^{-j\frac{2\pi}{\lambda}\frac{d^2}{2R}\sin^2((2\alpha+\theta)/2)} & e^{-j\frac{2\pi}{\lambda}\frac{d^2}{2R}\sin^2((\alpha+\theta)/2)} \\ e^{-j\frac{2\pi}{\lambda}\frac{d^2}{2R}\sin^2((\alpha+\theta)/2)} & e^{-j\frac{2\pi}{\lambda}\frac{d^2}{2R}\sin^2(\theta/2)} & e^{-j\frac{2\pi}{\lambda}\frac{d^2}{2R}\sin^2((-\alpha+\theta)/2)} & e^{-j\frac{2\pi}{\lambda}\frac{d^2}{2R}\sin^2((2\alpha+\theta)/2)} \\ e^{-j\frac{2\pi}{\lambda}\frac{d^2}{2R}\sin^2((2\alpha+\theta)/2)} & e^{-j\frac{2\pi}{\lambda}\frac{d^2}{2R}\sin^2((\alpha+\theta)/2)} & e^{-j\frac{2\pi}{\lambda}\frac{d^2}{2R}\sin^2(\theta/2)} & e^{-j\frac{2\pi}{\lambda}\frac{d^2}{2R}\sin^2((-\alpha+\theta)/2)} \\ e^{-j\frac{2\pi}{\lambda}\frac{d^2}{2R}\sin^2((-\alpha+\theta)/2)} & e^{-j\frac{2\pi}{\lambda}\frac{d^2}{2R}\sin^2((2\alpha+\theta)/2)} & e^{-j\frac{2\pi}{\lambda}\frac{d^2}{2R}\sin^2((\alpha+\theta)/2)} & e^{-j\frac{2\pi}{\lambda}\frac{d^2}{2R}\sin^2(\theta/2)} \end{bmatrix}$$

$$= e^{-j\frac{2\pi R}{\lambda}} \begin{bmatrix} e^{-j\frac{\pi d^2}{\lambda R}\sin^2(\theta/2)} & e^{-j\frac{\pi d^2}{\lambda R}\sin^2((-\alpha+\theta)/2)} & e^{-j\frac{\pi d^2}{\lambda R}\sin^2((2\alpha+\theta)/2)} & e^{-j\frac{\pi d^2}{\lambda R}\sin^2((\alpha+\theta)/2)} \\ e^{-j\frac{\pi d^2}{\lambda R}\sin^2((\alpha+\theta)/2)} & e^{-j\frac{\pi d^2}{\lambda R}\sin^2(\theta/2)} & e^{-j\frac{\pi d^2}{\lambda R}\sin^2((-\alpha+\theta)/2)} & e^{-j\frac{\pi d^2}{\lambda R}\sin^2((2\alpha+\theta)/2)} \\ e^{-j\frac{\pi d^2}{\lambda R}\sin^2((2\alpha+\theta)/2)} & e^{-j\frac{\pi d^2}{\lambda R}\sin^2((\alpha+\theta)/2)} & e^{-j\frac{\pi d^2}{\lambda R}\sin^2(\theta/2)} & e^{-j\frac{\pi d^2}{\lambda R}\sin^2((-\alpha+\theta)/2)} \\ e^{-j\frac{\pi d^2}{\lambda R}\sin^2((-\alpha+\theta)/2)} & e^{-j\frac{\pi d^2}{\lambda R}\sin^2((2\alpha+\theta)/2)} & e^{-j\frac{\pi d^2}{\lambda R}\sin^2((\alpha+\theta)/2)} & e^{-j\frac{\pi d^2}{\lambda R}\sin^2(\theta/2)} \end{bmatrix}$$

[Mathematical Formula 21]

As another example, a case in which the number N of antennas is 4, the diameter $d_t$ of the first circle C1 is equal to the diameter $d_r$ of the second circle C2, and the offset angle $\theta$ is 0° is considered. In this case, the channel matrix $H_{cir}$ is expressed as in Mathematical Formula 22 derived from Mathematical Formulas 23 to 25.

$$H_{cir} = e^{-j\frac{2\pi R}{\lambda}} \begin{bmatrix} 1 & e^{-j\frac{\pi d^2}{\lambda R}\sin^2(\alpha/2)} & e^{-j\frac{\pi d^2}{\lambda R}\sin^2(\alpha)} & e^{-j\frac{\pi d^2}{\lambda R}\sin^2(\alpha/2)} \\ e^{-j\frac{\pi d^2}{\lambda R}\sin^2(\alpha/2)} & 1 & e^{-j\frac{\pi d^2}{\lambda R}\sin^2(\alpha/2)} & e^{-j\frac{\pi d^2}{\lambda R}\sin^2(\alpha)} \\ e^{-j\frac{\pi d^2}{\lambda R}\sin^2(\alpha)} & e^{-j\frac{\pi d^2}{\lambda R}\sin^2(\alpha/2)} & 1 & e^{-j\frac{\pi d^2}{\lambda R}\sin^2(\alpha/2)} \\ e^{-j\frac{\pi d^2}{\lambda R}\sin^2(\alpha/2)} & e^{-j\frac{\pi d^2}{\lambda R}\sin^2(\alpha)} & e^{-j\frac{\pi d^2}{\lambda R}\sin^2(\alpha/2)} & 1 \end{bmatrix}$$

$$= e^{-j\frac{2\pi R}{\lambda}} \begin{bmatrix} 1 & e^{-j\frac{\pi d^2}{\lambda R}\sin^2(\alpha/2)} & e^{-j\frac{2\pi d^2}{\lambda R}\sin^2(\alpha/2)} & e^{-j\frac{\pi d^2}{\lambda R}\sin^2(\alpha/2)} \\ e^{-j\frac{\pi d^2}{\lambda R}\sin^2(\alpha/2)} & 1 & e^{-j\frac{\pi d^2}{\lambda R}\sin^2(\alpha/2)} & e^{-j\frac{2\pi d^2}{\lambda R}\sin^2(\alpha/2)} \\ e^{-j\frac{2\pi d^2}{\lambda R}\sin^2(\alpha/2)} & e^{-j\frac{\pi d^2}{\lambda R}\sin^2(\alpha/2)} & 1 & e^{-j\frac{\pi d^2}{\lambda R}\sin^2(\alpha/2)} \\ e^{-j\frac{\pi d^2}{\lambda R}\sin^2(\alpha/2)} & e^{-j\frac{2\pi d^2}{\lambda R}\sin^2(\alpha/2)} & e^{-j\frac{\pi d^2}{\lambda R}\sin^2(\alpha/2)} & 1 \end{bmatrix}$$

[Mathematical Formula 22]

$$\sin^2(\alpha) = 4\sin^2(\alpha/2)\cos^2(\alpha/2) = 2\sin^2(\alpha/2)$$ [Mathematical Formula 23]

$$\alpha = \frac{\pi}{2}$$ [Mathematical Formula 24]

$$\cos^2(\alpha/2) = \frac{1}{2}$$ [Mathematical Formula 25]

Since the channel matrix $H_{cir}$ is the circulant matrix, for the channel matrix $H_{cir}$, there are a diagonal matrix $\psi$, a first matrix F, and a second matrix $F^H$ having a relation expressed by Mathematical Formula 26 and Mathematical Formula 27. The second matrix $F^H$ is a complex conjugate transposed matrix of the first matrix F.

$$H_{cir} = F\Psi F^H$$ [Mathematical Formula 26]

$$\Psi = F^H H_{cir} F$$ [Mathematical Formula 27]

Here, an element $\psi_p$, of a p-th row and a p-th column of the diagonal matrix $\psi$ is expressed as in Mathematical Formula 28. p represents an integer from 1 to N.

$$\psi_p = \sum_{q=1}^{N} h_{1q} e^{-j\frac{2\pi}{N}(p-1)(q-1)}$$ [Mathematical Formula 28]

A relation between the element $yJ_p$ of the diagonal matrix $\psi$ and an eigenvalue $\lambda_2$ of a matrix $H_{cir}^H H_{cir}$ or a matrix $H_{cir} H_{cir}^H$ is expressed as in Mathematical Formula 29.

$$\lambda_p = |\psi_p|^2$$ [Mathematical Formula 29]

An element $f_{mn}$ of an m-th row and an n-th column of the first matrix F is expressed as in Mathematical Formula 30. As can be understood from Mathematical Formula 30, the first matrix F changes depending on only the number N of antennas. In other words, even when the channel matrix $H_{cir}$ has been changed, the first matrix F is constant as long as the channel matrix $H_{cir}$ is a circulant matrix.

$$f_{mn} = \frac{1}{\sqrt{N}} \exp\left(-\frac{2\pi}{N} j(m-1)(n-1)\right)$$ [Mathematical Formula 30]

The transmission device 10 uses the first matrix F as a transmission weight matrix. The transmission weight matrix may be called a pre-coding matrix. The transmission device 10 transmits a signal, which is obtained by pre-multiplying the pre-process signal s by the transmission weight matrix, as the transmission signal x through the plurality of transmission antennas 11. Thus, the transmission signal x is expressed as in Mathematical Formula 31. The transmission device 10 may use a matrix, which is obtained by rearranging the columns of the first matrix F, as the transmission weight matrix.

$$x = Fs$$ [Mathematical Formula 31]

The reception device 20 receives the signals transmitted from the plurality of transmission antennas 11 through the plurality of reception antennas 21. The reception signal y that is the signals received through the plurality of reception antennas 21 is expressed as in Mathematical Formula 32. Here, n represents a noise signal.

$$y = H_{cir} Fs + n$$ [Mathematical Formula 32]

Further, the reception device 20 acquires the post-process signal z by pre-multiplying the reception signal y by the reception weight matrix that is the complex conjugate transposed matrix (in this example, the second matrix $F^H$) of the transmission weight matrix. The post-process signal z is expressed as in Mathematical Formula 33. Here, n' represents a vector obtained by pre-multiplying the noise signal n by the reception weight matrix $F^H$.

$$z = F^H y = F^H H_{cir} Fs + F^H n = \Psi s + n'$$ [Mathematical Formula 33]

Mathematical Formula 33 represents that no interference occurs between channels. In other words, Mathematical Formula 33 represents that communication can be performed in the eigenmode. For example, communication performed in the radio communication system 1 can be regarded as a bundle of parallel communications, each of the parallel communications according to a single input and single output (SISO) scheme.

In this example, since the channel matrix $H_{cir}$ is the circulant matrix, the transmission weight matrix is constant as long as the number N of antennas does not change. Thus, it is possible to prepare the transmission weight matrix and the reception weight matrix in advance without depending on the channel matrix. In other words, it is possible to perform eigenmode communication without performing the singular value decomposition on the channel matrix and without transferring the right singular matrix from the reception side to the transmission side. In other words, the communication process can be simplified.

Further, the reception device 20 holds a known transmission signal u. For example, the known transmission signal u is a preamble signal or a pilot signal. The transmission device 10 transmits a signal, which is obtained by pre-multiplying the known transmission signal u serving as the pre-process signal by the transmission weight matrix, as the transmission signal through the plurality of transmission antennas 11.

As a result, the reception device 20 receives the signals, which are transmitted from the plurality of transmission antennas 11, as the reception signal through the plurality of reception antennas 21. The reception device 20 acquires a post-process signal, which is obtained by pre-multiplying the reception signal by the reception weight matrix, as a known reception signal u'. A relation between the known reception signal u' and the known transmission signal u is expressed as in Mathematical Formula 34.

$$u' = \Psi u + n'$$ [Mathematical Formula 34]

The reception device 20 acquires an estimation value (in other words, the channel estimation value) of a p-th channel based on the acquired known reception signal u', the known transmission signal u being held in advance, and Mathematical Formula 35. Here, $u_p$ represents a known transmission signal of the p-th channel, and $u_p'$ represents a known reception signal of the p-th channel. $n_p'$ represents a noise signal of the p-th channel. p represents an integer from 1 to N.

$$\eta_p = \frac{u_p'}{u_p} = \psi_p + \frac{n_p'}{u_p}$$ [Mathematical Formula 35]

The reception device 20 acquires a pre-process signal $s_p'$ of the p-th channel based on the acquired channel estimation value $\zeta_p$, the post-process signal $z_p$ of the p-th channel acquired on the pre-process signal s different from the known transmission signal, and Mathematical Formula 36.

$$s_p' = \frac{z_p}{\eta_p}$$ [Mathematical Formula 36]

As described above, the reception device 20 acquires the post-process signal based on the signals transmitted from the plurality of transmission antennas 11 in a case where a signal (in other words, another signal) different from the known transmission signal is used as the pre-process signal. Then, the reception device 20 acquires the pre-process signal from the acquired post-process signal based on the known transmission signal and the known reception signal.

Through the above operation, the pre-process signal can be easily acquired.

Further, when there is interference between data streams due to a multipath or the like, the reception device 20 may perform MIMO signal separation and detection through a normal MIMO channel estimation, a zero-forcing (ZF) technique, a minimum mean square error (MMSE) technique, or the like.

For example, the positions of the of the transmission antennas 11 and the reception antennas 21 may be changed due to movement or rotation of the transmission device 10 or the reception device 20. In this case, the channel matrix $H_{cir}$ changes from the circulant matrix to a matrix different from the circulant matrix. In this case, the reception device 20 may perform MIMO signal separation and detection through a normal MIMO channel estimation, a zero-forcing (ZF) technique, a minimum mean square error (MMSE) technique, or the like.

Further, the transmission device 10 may transmit, the known transmission signal without pre-multiplying the known transmission signal by the transmission weight matrix. In this case, the transmission device 10 transmits the known transmission signal through any one of the transmission antennas 11. As a result, the reception device 20 receives the transmitted known transmission signal through each of the reception antennas 21 as the known reception signal. The reception device 20 acquires the channel estimation value for each channel based on the known reception signal received by each of the reception antennas 21 and the known transmission signal.

Next, a signal-to-interference plus noise ratio (SINR) will be described.

When the transmission device 10 pre-multiplies the pre-process signal by the transmission weight matrix, and transmits the signal after the multiplication through the plurality of transmission antennas 11 (in other words, when pre-coding is performed), a signal-to-interference plus noise ratio $SINR_p$ of the p-th channel is in proportion to a p-th eigenvalue $\lambda_p$ of the matrix $H_{cir}^H H_{cir}$ or the matrix $H_{cir} H_{cir}^H$. The eigenvalue $\lambda_p$ of the matrix $H_{cir}^H H_{cir}$ is obtained by solving an eigen equation expressed by Mathematical Formula 37. A represents an unknown variable indicating an eigenvalue. I represents an identity matrix.

$$\det(H_{cir}^H H_{cir} - \Lambda I) = 0 \quad \text{[Mathematical Formula 37]}$$

When the transmission device 10 transmits the pre-process signal through the plurality of transmission antennas 11 without pre-multiplying the pre-process signal by the transmission weight matrix (in other words, when pre-coding is not performed), the signal-to-interference plus noise ratio $SINR_p$ of the p-th channel is expressed as in Mathematical Formula 38. In this case, as can be understood from Mathematical Formula 38, the signal-to-interference plus noise ratios $SINR_p$ of all channels have the same value.

$$SINR_p = \frac{1}{[(H_{cir}^H H_{cir})^{-1}]_{p,p}} \quad \text{[Mathematical Formula 38]}$$

As an example, a case in which the number N of antennas is 3, the diameter $d_t$ of the first circle C1 is equal to the diameter $d_r$ of the second circle C2, and the offset angle θ is 0' will be described. In this case, the eigenvalue $\lambda_p$ is expressed as in Mathematical Formula 39 obtained from Mathematical Formula 37. Here, β is expressed as in Mathematical Formula 40.

$$\lambda_1 = 5 + 4\cos\beta \quad \text{[Mathematical Formula 39]}$$
$$\lambda_2 = \lambda_3 = 2 - 2\cos\beta$$

$$\beta = \frac{\pi d^2 \sin^2(\alpha/2)}{\lambda R} \quad \text{[Mathematical Formula 40]}$$

Figure 4:
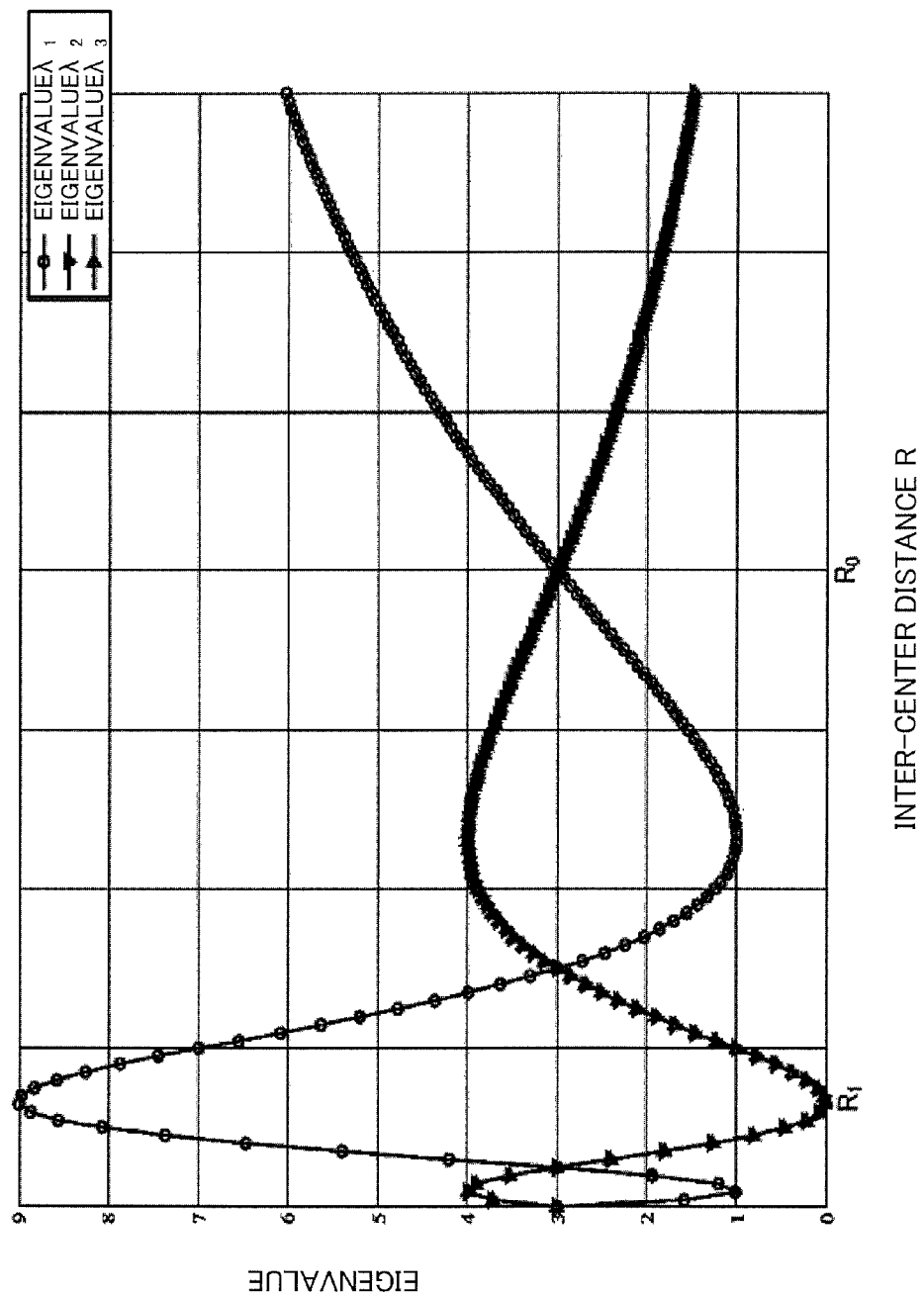
FIG. 4 is a graph illustrating an example of a relation between an eigenvalue and an inter-center distance of a circle on which transmission and reception antennas are arranged according to the first embodiment.

The eigenvalue $\lambda_p$ changes depending on the inter-center distance R as illustrated in FIG. 4. When the inter-center distance R is a maximum-capacity distance $R_0$ which will be described later, all eigenvalues $\lambda_p$ have the same value. In this case, since communication is performed in the eigenmode, the channel capacity has a maximum value.

Further, when the number N of antennas is 3, the diameter $d_t$ of the first circle C1 is equal to the diameter $d_r$ of the second circle C2, and the offset angle θ is 0°, the signal-to-interference plus noise ratio $SINR_p$ is expressed as in Mathematical Formula 41 obtained from Mathematical Formula 38.

$$SINR_1 = \quad \text{[Mathematical Formula 41]}$$
$$SINR_2 = SINR_3 = \frac{(1-\cos\beta)(5+4\cos\beta)}{2+\cos\beta}$$

Figure 5:
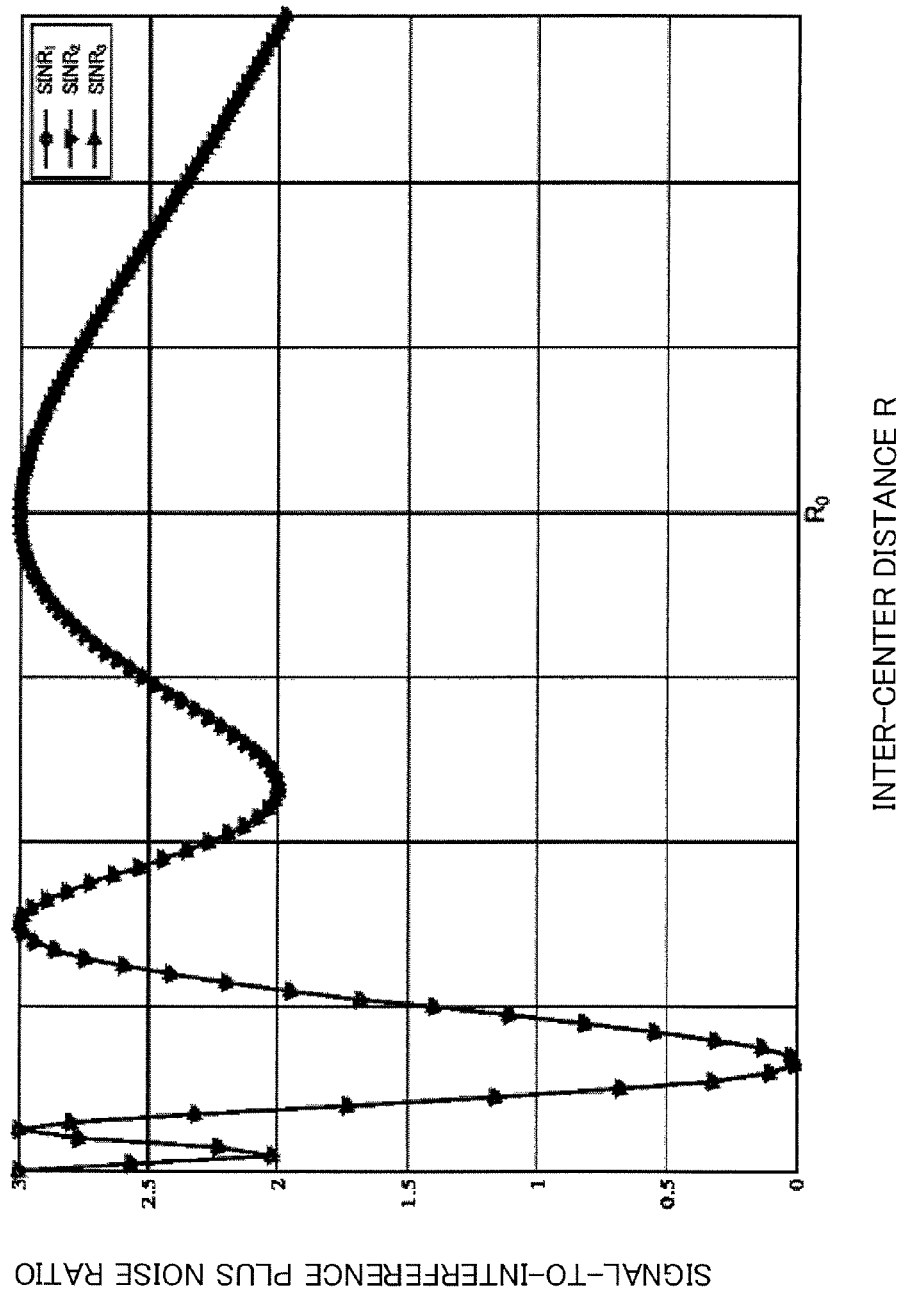
FIG. 5 is a graph illustrating an example of a relation between a signal-to-interference noise ratio and an inter-center distance of a circle on which transmission and reception antennas are arranged according to the first embodiment.

The signal-to-interference plus noise ratios $SINR_p$ have the same value as expressed in Mathematical Formula 41 and illustrated in FIG. 5. The signal-to-interference plus noise ratio $SINR_p$ changes depending on the inter-center distance R as illustrated in FIG. 5. When the inter-center distance R is the maximum-capacity distance $R_0$ which will be described later, the signal-to-interference plus noise ratio $SINR_p$ has a maximum value. In this case, the channel capacity has a maximum value.

Figure 6:
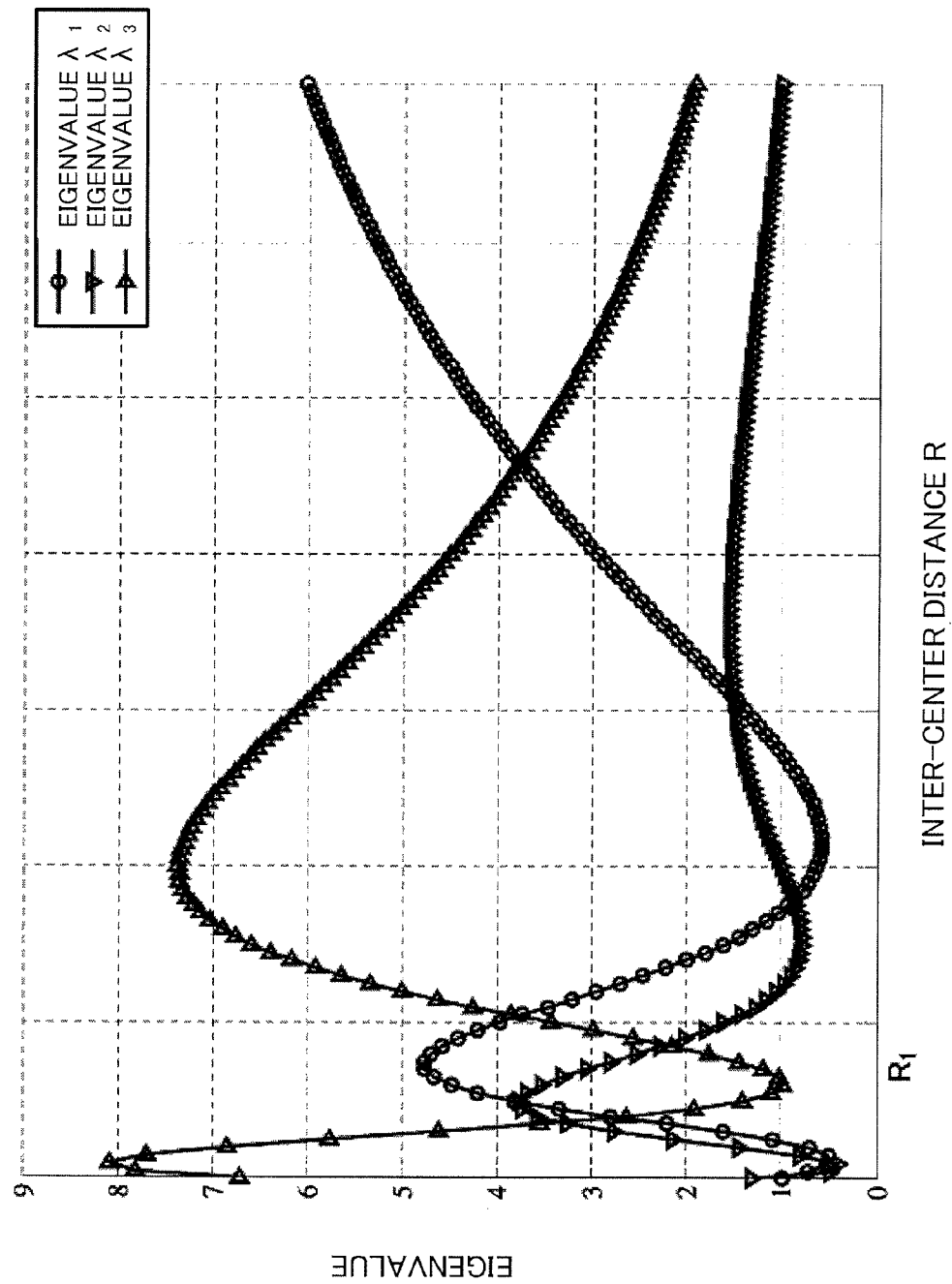
FIG. 6 is a graph illustrating an example of a relation between an eigenvalue and an inter-center distance of a circle on which transmission and reception antennas are arranged according to the first embodiment.

Further, when the number N of antennas is 3, the diameter $d_t$ of the first circle C1 is equal to the diameter $d_r$ of the second circle C2, and the offset angle θ is 15°, the eigenvalue $\lambda_p$ changes depending on the inter-center distance R as illustrated in FIG. 6.

When the offset angle θ is 0° (that is, FIG. 4), there is an inter-center distance R (a distance $R_1$) at which both of an eigenvalue $\lambda_2$ and an eigenvalue $\lambda_3$ are 0. Thus, when the inter-center distance R is the distance $R_1$, it is difficult to perform communication through channels corresponding to the eigenvalue $\lambda_2$ and the eigenvalue $\lambda_3$. Meanwhile, in the case in which the offset angle θ is 15° (that is, FIG. 6), when the inter-center distance R is the distance $R_1$, both of the eigenvalue $\lambda_2$ and the eigenvalue $\lambda_3$ have values larger than 0. In this case, thus, it is possible to perform communication through channels corresponding to the eigenvalue $\lambda_2$ and the eigenvalue $\lambda_3$.

As described above, by changing the offset angle θ, it is possible to adjust the channel capacity without changing the inter-center distance R, the diameter $d_t$ of the first circle C1, and/or the diameter $d_r$ of the second circle C2.

Next, as another example, a case in which the number N of antennas is 4, the diameter $d_t$ of the first circle C1 is equal to the diameter $d_r$ of the second circle C2, and the offset angle θ is 0° will be described. In this case, the eigenvalue $\lambda_p$ is expressed as in Mathematical Formula 42 obtained from Mathematical Formula 37.

$$\lambda_1 = 4 + 4\cos^2\beta + 8\cos\beta$$
$$\lambda_2 = \lambda_4 = 4(1-\cos^2\beta)$$
$$\lambda_3 = 4 + 4\cos^2\beta - 8\cos\beta \quad \text{[Mathematical Formula 42]}$$

Further, in this case, the signal-to-interference plus noise ratio $SINR_p$ is expressed as in Mathematical Formula 43 obtained from Mathematical Formula 38.

$$SINR_1 = SINR_2 = SINR_3 =$$
$$SINR_4 = 4(\cos^4\beta - 2\cos^2\beta + 1) \quad \text{[Mathematical Formula 43]}$$

Next, as another example, a case in which the number N of antennas is 2, the diameter $d_t$ of the first circle C1 is equal to the diameter $d_r$ of the second circle C2, and the offset angle θ is 0° will be described. In this case, the eigenvalue $\lambda_p$ is expressed as in Mathematical Formula 44.

$$\lambda_1 = 2 + 2\cos\left(\frac{\pi d^2}{\lambda R}\right) \quad \text{[Mathematical Formula 44]}$$
$$\lambda_2 = 2 - 2\cos\left(\frac{\pi d^2}{\lambda R}\right)$$

Further, in this case, the signal-to-interference plus noise ratio $SINR_p$ is expressed as in Mathematical Formula 45.

$$SINR_1 = SINR_2 = 2\sin^2\left(\frac{\pi d^2}{\lambda R}\right) \quad \text{[Mathematical Formula 45]}$$

Next, a relation among the inter-center distance R, the diameter $d_t$ of the first circle C1, and the diameter $d_r$ of the second circle C2 will be described. In this example, in the radio communication system 1, the plurality of transmission antennas 11 and the plurality of reception antennas 21 are arranged such that a correlation between two columns among a plurality of columns constituting the channel matrix $H_{cir}$ approaches 0.

First, a case in which the number N of antennas is 4, the diameter $d_t$ of the first circle C1 is equal to the diameter $d_r$ of the second circle C2, and the offset angle θ is 0° will be described. In other words, in this case, each of the diameter $d_t$ of the first circle C1 and the diameter $d_r$ of the second circle C2 is equal to the representative diameter d. In this case, the channel matrix $H_{cir}$ is expressed as in Mathematical Formula 22 as described above. Using β expressed by Mathematical Formula 40, Mathematical Formula 46 is derived from Mathematical Formula 22.

$$H_{cir} = e^{-j\frac{2\pi R}{\lambda}} \begin{bmatrix} 1 & e^{-j\beta} & e^{-j2\beta} & e^{-j\beta} \\ e^{-j\beta} & 1 & e^{-j\beta} & e^{-j2\beta} \\ e^{-j2\beta} & e^{-j\beta} & 1 & e^{-j\beta} \\ e^{-j\beta} & e^{-j2\beta} & e^{-j\beta} & 1 \end{bmatrix}$$ [Mathematical Formula 46]

Two channels orthogonal to each other is equivalent to a correlation between two columns corresponding to the two channels to be 0 in the channel matrix $H_{cir}$. A correlation between a first column and a second column in the channel matrix $H_{cir}$ is expressed as in Mathematical Formula 47.

$$\begin{bmatrix} 1 \\ e^{-j\beta} \\ e^{-j2\beta} \\ e^{-j\beta} \end{bmatrix}^H \begin{bmatrix} e^{-j\beta} \\ 1 \\ e^{-j\beta} \\ e^{-j2\beta} \end{bmatrix} =$$ [Mathematical Formula 47]

$$1 \times e^{-j\beta} + e^{j\beta} \times 1 + e^{j2\beta} \times e^{-j\beta} + e^{j\beta} \times e^{-j2\beta} = 2(e^{j\beta} + e^{-j\beta}) = 4\cos(\beta)$$

Thus, when the correlation is 0, β is expressed as in Mathematical Formula 48. Here, n represents an integer.

$$\beta = \frac{(2n-1)\pi}{2}$$ [Mathematical Formula 48]

Mathematical Formula 49 is derived from Mathematical Formula 48 and Mathematical Formula 40.

$$d^2 = \frac{\lambda R(2n-1)}{2\sin^2(\alpha/2)}$$ [Mathematical Formula 49]

As can be understood from Mathematical Formula 49, the representative diameter d relative to the inter-center distance R has the smallest value when n is 1. In this example, in order to miniaturize the transmission device 10 and the reception device 20, n is set to 1. As a result, Mathematical Formula 50 is derived from Mathematical Formula 49.

$$d^2 = \frac{\lambda R}{2\sin^2(\alpha/2)} = 2\frac{\lambda R/4}{\sin^2(\alpha/2)}$$ [Mathematical Formula 50]

Further, even when the number N of antennas is not 4, 4 in a numerator of a right side in Mathematical Formula 50 is set as the number N of antennas so that Mathematical Formula 50 can be extended and used. As a result, through the same process as the process of deriving Mathematical Formula 50 (that is, the process of calculating a correlation as in Mathematical Formula 47 using Mathematical Formula 19 and Mathematical Formula 20 and equating the calculated correlation with 0 (when θ=0)), Mathematical Formula 51 is derived.

$$d_t d_r = \frac{2}{\sin^2(\pi/N)} \frac{\lambda R}{N}$$ [Mathematical Formula 51]

In this example, in the radio communication system 1, the plurality of transmission antennas 11 and the plurality of reception antennas 21 are arranged such that the inter-center distance R, the diameter $d_t$ of the first circle C1, and the diameter $d_r$ of the second circle C2 satisfy the relation expressed by Mathematical Formula 51. The maximum-capacity distance $R_0$ is the inter-center distance R satisfying the relation expressed by Mathematical Formula 51.

Next, a case in which the number N of antennas is not 4 will be described. When the number N of antennas is 3 or when the number of antennas is 5 or more, in the radio communication system 1, the plurality of transmission antennas 11 and the plurality of reception antennas 21 may be arranged based on Mathematical Formula 51, similarly to when the number N of antennas is 4. The same applies even when the diameter $d_t$ of the first circle C1 is different from the diameter $d_r$ of the second circle C2. Further, the same applies even when the offset angle θ is not 0°.

When the number N of antennas is 3 or 4 and the offset angle θ is 0°, the plurality of transmission antennas 11 and the plurality of reception antennas 21 can be arranged such that the relation expressed by Mathematical Formula 51 is satisfied. Thus, in this case, it is possible to perform communication (in other words, maximum-capacity communication) in which the channel capacity has a maximum value. Meanwhile, when the number N of antennas is 5 or more, it is difficult to perform the maximum-capacity communication, the plurality of transmission antennas 11 and the plurality of reception antennas 21 may be arranged based on Mathematical Formula 51.

When the number N of antennas is 2, in the radio communication system 1, the plurality of transmission antennas 11 and the plurality of reception antennas 21 are arranged such that the inter-center distance R, the diameter $d_t$ of the first circle C1, and the diameter $d_r$ of the second circle C2 satisfy a relation expressed by Mathematical Formula 52. The same applies even when the diameter $d_t$ of the first circle C1 is different from the diameter $d_r$ of the second circle C2. Further, the same applies even when the offset angle θ is not 0°.

$$d_t d_r = \frac{\lambda R}{2}$$ [Mathematical Formula 52]

Here, an example of the inter-center distance R and the representative diameter d satisfying the relations expressed by Mathematical Formula 51 and Mathematical Formula 52 will be described. Table 1 represents the inter-center distance R and the representative diameter d when the frequency of the carrier wave is 60 GHz and the number N of antennas is 2, 3, and 4. For example, when the number N of antennas is 2 and the inter-center distance R is 5 m, the representative diameter d is 11.1 cm.

Similarly, Table 2 represents the inter-center distance R and the representative diameter d when the representative diameter d when the frequency of the carrier wave is 83 GHz and the number N of antennas is 2, 3, and 4. For example, when the number N of antennas is 2, and the inter-center distance R is 1000 m, the representative diameter d is 1.34 m.

When the frequency of the carrier wave is included in a millimeter-wave frequency band as described above, it can be said that the representative diameter d has the value with which the transmission device 10 and the reception device 20 can be sufficiently miniaturized.

TABLE 1

| | N | | |
|---|---|---|---|
| R | 2 | 3 | 4 |
| 5 m | 11.1 cm | 14.9 cm | 15.8 cm |
| 500 m | 1.11 m | 1.49 m | 1.58 m |

TABLE 2

| | N | | |
|---|---|---|---|
| R | 2 | 3 | 4 |
| 1000 m | 1.34 m | 1.79 m | 1.90 m |

Further, in the radio communication system 1, the plurality of transmission antennas 11 and the plurality of reception antennas 21 may be arranged such that the inter-center distance R, the diameter $d_t$ of the first circle C1, and the diameter $d_r$ of the second circle C2 do not satisfy the relation expressed by Mathematical Formula 51 or Mathematical Formula 52.

Next, an example of a configuration of the radio communication system 1 will be described.

Figure 7:
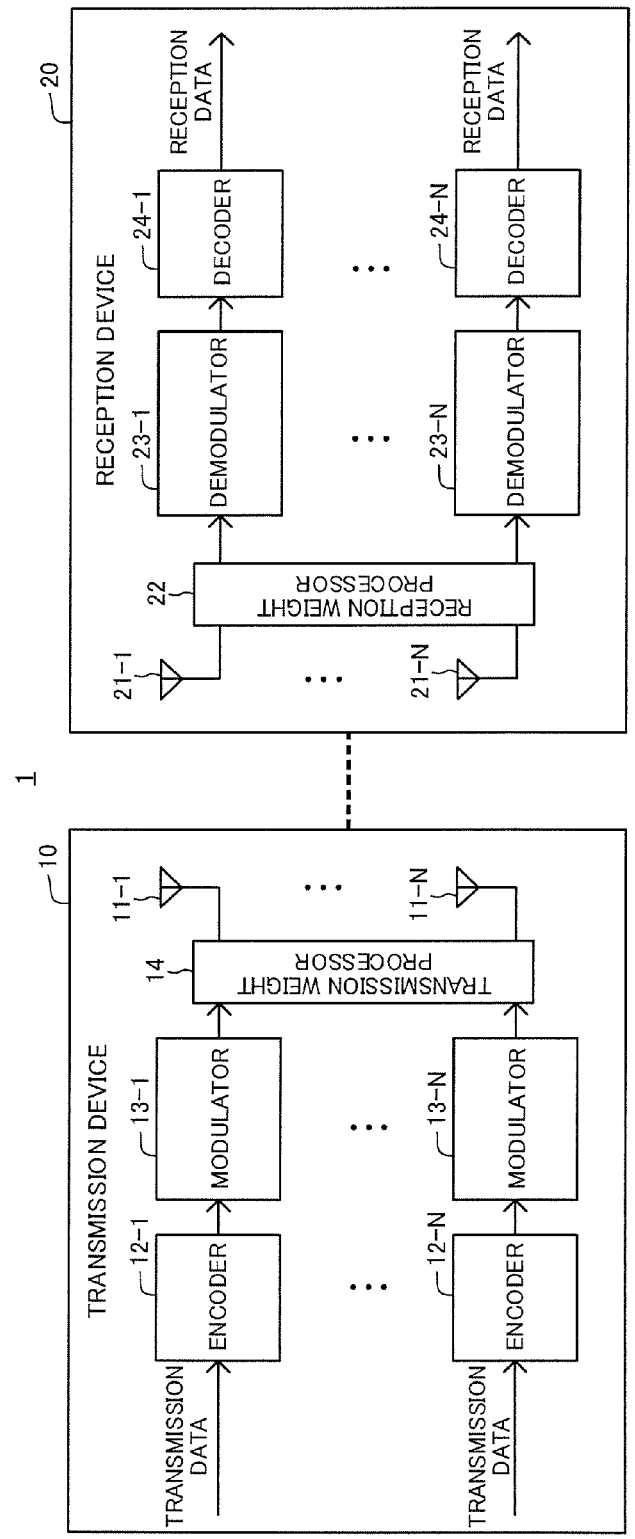
FIG. 7 is a view illustrating an example of a configuration of a radio communication system according to the first embodiment.

The transmission device 10 includes a plurality of (N, in this example) encoders 12-1, . . . , and 12-N, a plurality of (N, in this example) modulators 13-1, . . . , and 13-N, and a transmission weight processor 14 as illustrated in FIG. 7. The encoder 12-$i$ (i represents an integer from 1 to N) is referred to simply as an "encoder 12" when the encoders need not be distinguished from each other. Similarly, the modulator 13-$i$ is referred to simply as a "modulator 13" when the modulators need not be distinguished from each other.

In this example, functions of the encoder 12, the modulator 13 and the transmission weight processor 14 may be implemented by a large scale integration (LSI). Alternatively, functions of the encoder 12, the modulator 13, and the transmission weight processor 14 may be implemented by a programmable logic circuit (e.g., a programmable logic device (PLD) or a field-programmable gate array (FPGA)).

Figure 8:
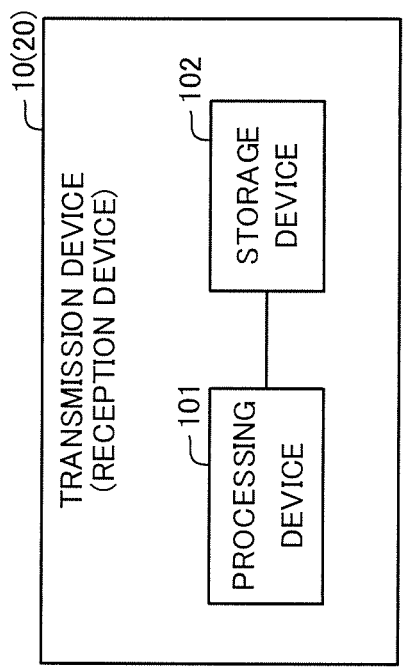
FIG. 8 is a view illustrating an example of a configuration of a transmission device (or a reception device) according to the first embodiment.

Alternatively, the transmission device 10 may include a processing device 101 and a storage device 102 as illustrated in FIG. 8, and the functions may be implemented by the processing device 101 executing a program stored in the storage device 102. For example, the processing device 101 is a central processing unit (CPU) or a digital signal processor (DSP).

For example, the storage device 102 includes at least one of a random access memory (RAM), a read only memory (ROM), a hard disk drive (HDD), a solid state drive (SSD), a semiconductor memory, and an organic memory.

The encoder 12 adds an error correction code used to perform an error correction (e.g., forward error correction (FEC)) process to input transmission data. For example, the error correction code is a convolution code, a turbo code, or a low-density parity-check code (LDPC). The encoder 12 outputs the transmission data including the error correction code to the modulator 13.

The transmission data input to each encoder 12 is an example of a stream signal. In other words, the plurality of encoders 12 add the error correction code to a plurality of stream signals, respectively.

The modulator 13, by modulating the transmission data output from the encoder 12 according to a certain modulation scheme, converts the transmission data into a modulation signal. For example, the modulation scheme is quadrature phase shift keying (QPSK), 16 quadrature amplitude modulation (16QAM), or 64 quadrature amplitude modulation (64QAM). The modulator 13 outputs the modulation signal to the transmission weight processor 14. In this example, each of the transmission data and the modulation signal is an example of the pre-process signal.

The transmission weight processor 14 pre-multiplies a plurality of modulation signals output from the plurality of modulators 13 by the transmission weight matrix, and generates a plurality of transmission signals in association with the plurality of transmission antennas 11. The transmission weight processor 14 outputs the plurality of generated transmission signals to the transmission antennas 11 associated with the respective transmission signals. The plurality of transmission antennas 11 transmit the plurality of transmission signals output from the transmission weight processor 14.

The reception device 20 includes a reception weight processor 22, a plurality of (N, in this example) demodulators 23-1, . . . , and 23-N, and a plurality of (N, in this example) decoders 24-1, . . . , and 24-N. The demodulator 23-$i$ (i represents an integer from 1 to N) is referred to as simply as a "demodulator 23" when the demodulators need not be distinguished from each other. Similarly, the decoder 24-$i$ is referred to as simply as a "decoder 24" when the decoders need not be distinguished from each other.

In this example, functions of the reception weight processor 22, the demodulator 23, and the decoder 24 are implemented by an LSI. Alternatively, the functions of the reception weight processor 22, the demodulator 23, and the decoder 24 may be implemented by a programmable logic circuit device.

Alternatively, the reception device 20 may include the processing device 101 and the storage device 102 as illustrated in FIG. 8, similarly to the transmission device 10, and the functions may be implemented by the processing device 101 executing a program stored in the storage device 102.

The reception weight processor 22, by pre-multiplying a plurality of reception signals received by the plurality of reception antennas 21 by the reception weight matrix, acquires a plurality of pre-demodulation signals. The reception weight processor 22 outputs the plurality of acquired pre-demodulation signals to the plurality of demodulators 23.

The demodulator 23, by demodulating the pre-demodulation signal output from the reception weight processor 22, converts the pre-demodulation signal into reception data. The demodulator 23 outputs the reception data to the decoder 24.

The decoder 24 executes the error correction process on the reception data output from the demodulator 23. The decoder 24 outputs the reception data after the execution. In this example, each of the reception data and the pre-demodulation signal is an example of the post-process signal.

(Operation)

Next, an example of an operation of the radio communication system 1 will be described.

The transmission device 10 holds the transmission weight matrix and the known transmission signal in advance. Similarly, the reception device 20 holds the reception weight matrix and the known transmission signal in advance.

First, the transmission device 10 modulates the known transmission signal, and transmits a signal, which is obtained by pre-multiplying the modulated known transmission signal by the transmission weight matrix, as the transmission signal through the plurality of transmission antennas 11.

As a result, the reception device 20 receives the signals transmitted from the plurality of transmission antennas 11 through the plurality of reception antennas 21 as the reception signal. Then, the reception device 20 demodulates a signal obtained by pre-multiplying the reception signal by the reception weight matrix, and acquires the demodulated signal as the known reception signal. The reception device 20 acquires the channel estimation value $\eta_p$ based on the acquired known reception signal and the known transmission signal being held in advance.

Thereafter, the transmission device 10 adds error correction code to the transmission data, modulates the transmission data after the addition, and transmits a signal, which is obtained by pre-multiplying the modulation signal by the transmission weight matrix, as the transmission signal through the plurality of transmission antennas 11.

As a result, the reception device 20 receives the signals, which are transmitted from the plurality of transmission antennas 11, as the reception signal through the plurality of reception antennas 21. Then, the reception device 20 acquires the pre-demodulation signal based on the signal obtained by pre-multiplying the reception signal by the reception weight matrix and the acquired channel estimation value $\eta_p$. Then, the reception device 20 demodulates the acquired pre-demodulation signal, and executes the error correction process on the demodulated reception data. Then, the reception device 20 acquires the reception data after the execution as the transmission data.

As described above, in the radio communication system 1 according to the first embodiment, the plurality of transmission antennas 11 and the plurality of reception antennas 21 are arranged such that the channel matrix $H_{cir}$ is the circulant matrix.

Accordingly, it is possible to simplify the communication process using the plurality of transmission antennas 11 and the plurality of reception antennas 21.

Further, in the radio communication system 1 according to the first embodiment, the plurality of transmission antennas 11 are arranged at equal intervals on the circumference of the first circle C1. Further, the plurality of reception antennas 21 are arranged at equal intervals on the circumference of the second circle C2 that is parallel and concentric to the first circle C1.

Accordingly, the channel matrix $H_{cir}$ can be the circulant matrix with a high degree of accuracy.

In addition, in the radio communication system 1 according to the first embodiment, the channel response $h_{mn}$ is determined in advance based on the distance $r_{mn}$ between the n-th transmission antenna 11 and the m-th reception antenna 21.

Further, in the radio communication system 1 according to the first embodiment, the signal obtained by pre-multiplying the pre-process signal by the transmission weight matrix is transmitted as the transmission signal through the plurality of transmission antennas 11. The transmission weight matrix is the first matrix F having the relation expressed by Mathematical Formula 26 and Mathematical Formula 27, or a matrix in which columns of the first matrix F are rearranged. Further, in the radio communication system 1, the post-process signal is acquired by pre-multiplying the reception signal, which is received by the plurality of reception antennas 21, by the reception weight matrix that is the complex conjugate transposed matrix of the transmission weight matrix.

The first matrix F is constant even when the channel matrix $H_{eir}$ changes as long as the channel matrix $H_{eir}$ is the circulant matrix. Thus, it is possible to prepare the transmission weight matrix and the reception weight matrix without depending on the channel matrix $H_{cir}$. In other words, the eigenmode communication can be performed without performing the singular value decomposition on the channel matrix $H_{eir}$ and without transferring the right singular matrix from the reception side to the transmission side Further, in the radio communication system 1 according to the first embodiment, the plurality of transmission antennas 11 and the plurality of reception antennas 21 are arranged such that a correlation between two columns of the channel matrix $H_{eir}$ approaches zero (0).

Accordingly, it is possible to reliably increase the channel capacity.

Further, in the radio communication system 1 according to the first embodiment, the plurality of transmission antennas 11 and the plurality of reception antennas 21 are arranged such that a relation among the inter-center distance R, the diameter $d_t$ of the first circle C1, and the diameter $d_r$ of the second circle C2 is expressed by Mathematical Formula 51.

Accordingly, it is possible to reliably increase the channel capacity.

Further, in the radio communication system 1 according to the first embodiment, the pre-process signal is acquired based on the known reception signal and the known transmission signal from the post-process signal acquired based on the signals transmitted from the plurality of transmission antennas 11 by using another signal as the pre-process signal. The known transmission signal is a predetermined signal. The known reception signal is a signal acquired as the post-process signal based on the signals transmitted from the plurality of transmission antennas 11 by using the known transmission signal as the pre-process signal.

Accordingly, the pre-process signal can be easily acquired.

In the radio communication system 1 according to the first embodiment, the pre-process signal may be pre-multiplied by the transmission weight matrix by performing fast Fourier transform.

Accordingly, the process of pre-multiplying the pre-process signal by the transmission weight matrix can be executed at a high speed.

In the radio communication system 1 according to the first embodiment, the reception signal may be pre-multiplied by the reception weight matrix by performing fast Fourier transform.

Accordingly, the process of pre-multiplying the reception signal by the reception weight matrix can be executed at a high speed.

The reception device 20 according to the first embodiment may calculate the signal-to-interference plus noise ratio based on the reception signal and execute the error correction process based on the calculated signal-to-interference plus noise ratio.

First Modified Example of First Embodiment

Next, a radio communication system according to a first modified example of the first embodiment will be described.

The radio communication system according to the first modified example of the first embodiment is different from the radio communication system according to the first embodiment in that spatial interleaving is executed. Hereinafter, the difference will be mainly described. In the description of the first modified example of the first embodiment, elements having the same reference numerals as those used in the first embodiment are the same as or almost the same as those in the first embodiment.

Figure 9:
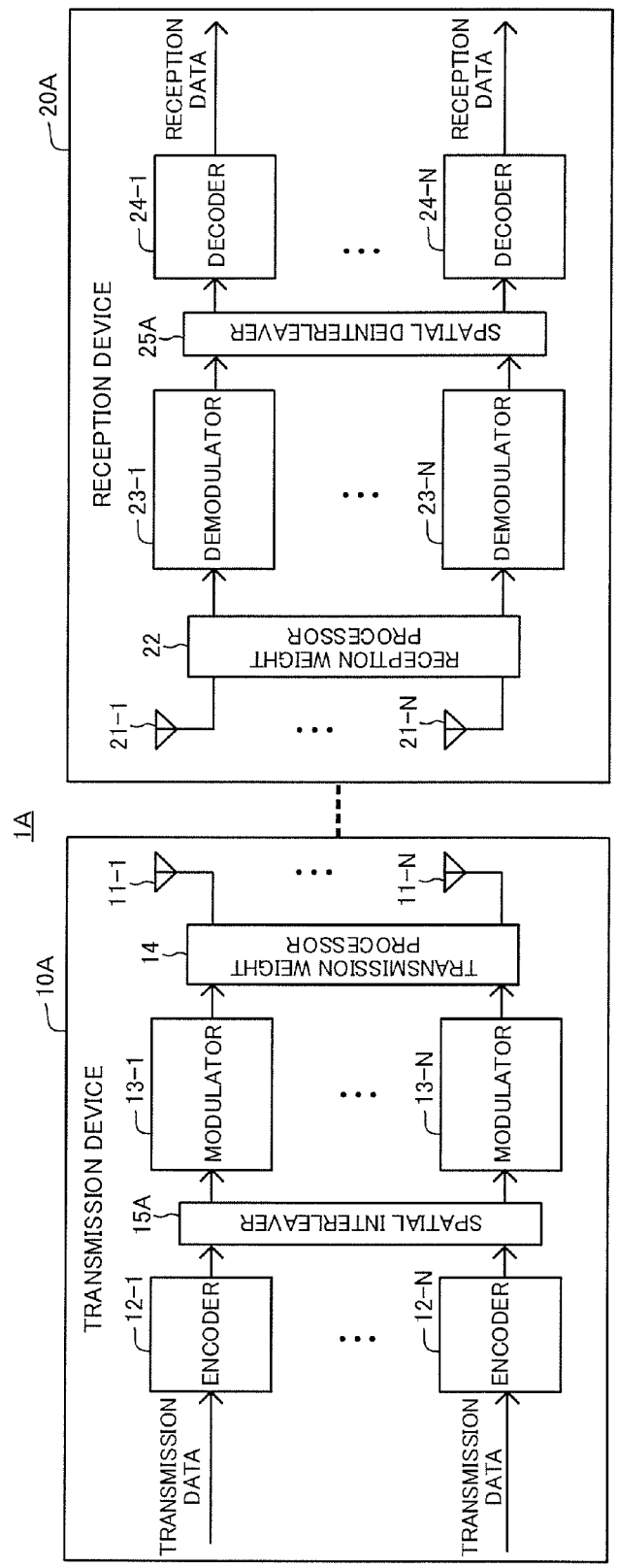
FIG. 9 is a view illustrating a configuration of a radio communication system according to a first modified example of the first embodiment.

As illustrated in FIG. 9, a radio communication system 1A according to the first modified example includes a transmission device 10A and a reception device 20A instead of the transmission device 10 and the reception device 20.

The transmission device 10A includes a spatial interleaver 15A in addition to the configuration of the transmission device 10.

The reception device 20A includes a spatial deinterleaver 25A in addition to the configuration of the reception device 20.

The spatial interleaver 15A is arranged between the plurality of encoders 12 and the plurality of modulators 13. The spatial interleaver 15A may be arranged between the plurality of modulators 13 and the transmission weight processor 14.

The spatial interleaver 15A executes spatial interleaving on plural pieces of transmission data output from the plurality of encoders 12. The spatial interleaving may include a process of rearranging a plurality of data blocks included in a plurality of stream signals (in other words, a plurality of sequences) such that a plurality of data blocks that are consecutive in one stream signal are included in a plurality of different stream signals.

The spatial interleaver 15A outputs plural pieces of transmission data after the execution to the plurality of modulators 13.

Figure 10:
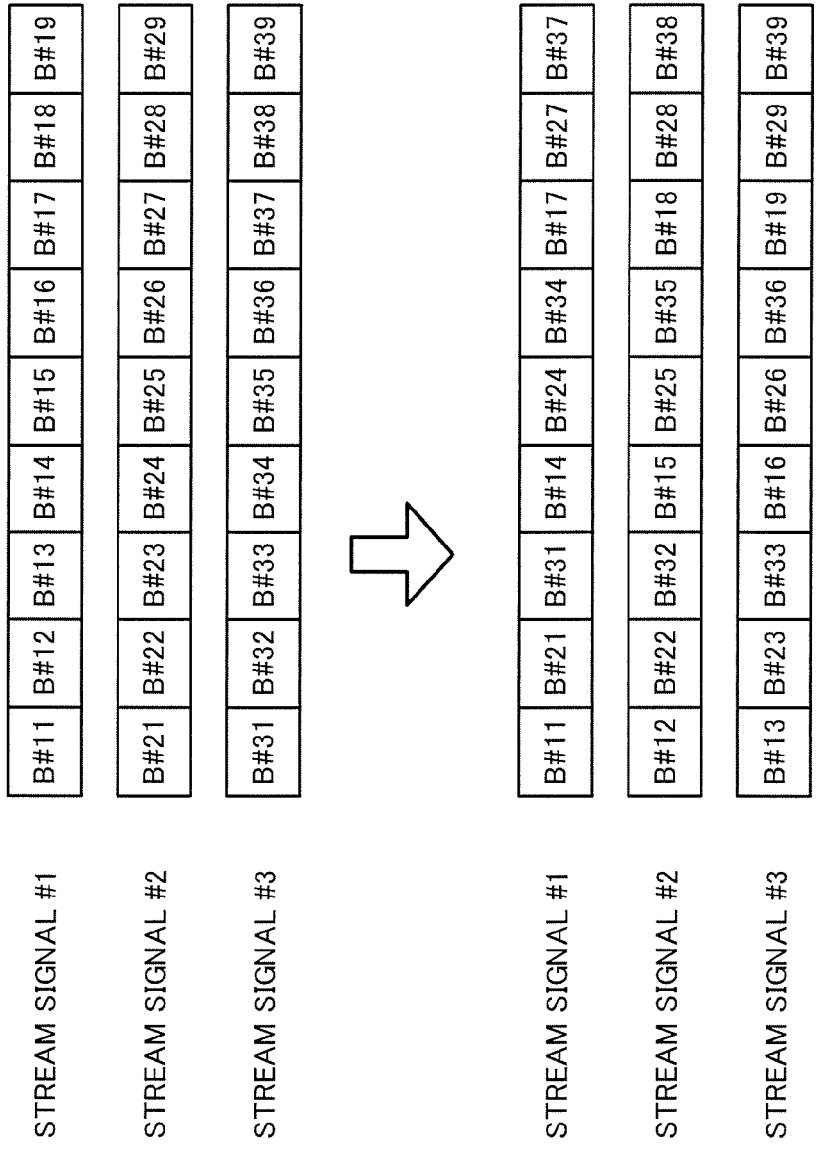
FIG. 10 is an explanatory view schematically illustrating an example of an execution result of spatial interleaving according to the first embodiment.

FIG. 10 illustrates a result of executing the spatial interleaving on a plurality of data blocks B#11 to B#19, B#21 to B#29, and B#31 to B#39 included in three stream signals #1 to #3 as an example. For example, the plurality of data blocks B#11 to B#13 that are consecutive in the stream signal #1 are rearranged in the stream signals #1 to #3, respectively. Similarly, the plurality of data blocks B#21 to B#23 that are consecutive in the stream signal #2 are rearranged in the stream signals #1 to #3, respectively, as well. The other data blocks are similarly processed.

The spatial deinterleaver 25A executes spatial deinterleaving on plural pieces of reception data output from the demodulator 23. The spatial deinterleaving may include a process of restoring an arrangement of the data blocks included in the respective stream signals to an arrangement before the spatial interleaving is executed through a process similar to the spatial interleaving. The spatial deinterleaver 25A outputs plural pieces reception data after the execution to the plurality of decoders 24. The spatial deinterleaver 25A may be arranged between the reception weight processor 22 and the demodulator 23.

As described above, in the radio communication system 1A according to the first modified example, in addition to the functions of the radio communication system 1 according to the first embodiment, the error correction code is added to each of a plurality of stream signals, and the spatial interleaving is executed on the plurality of stream signals after the addition. Further, in the radio communication system 1A, the plurality of stream signals after the execution are transmitted through the plurality of transmission antennas 11.

Accordingly, even when a reception quality in a certain channel is lower than a reception quality in other channels, it is possible to reduce a possibility that information is hardly reconstructed based on the error correction code.

For example, even when the inter-center distance R is different from the maximum-capacity distance $R_0$, it is possible to prevent a communication quality from excessively degrading.

Second Modified Example of First Embodiment

Next, a radio communication system according to a second modified example of the first embodiment will be described. The radio communication system according to the second modified example of the first embodiment is different from the radio communication system according to the first modified example of the first embodiment in that multi-carrier transmission is performed. Hereinafter, the difference will be mainly described. In the description of the second modified example of the first embodiment, elements having the same reference numerals as those used in the first modified example of the first embodiment are the same as or almost the same as those in the first modified example of the first embodiment.

Figure 11:
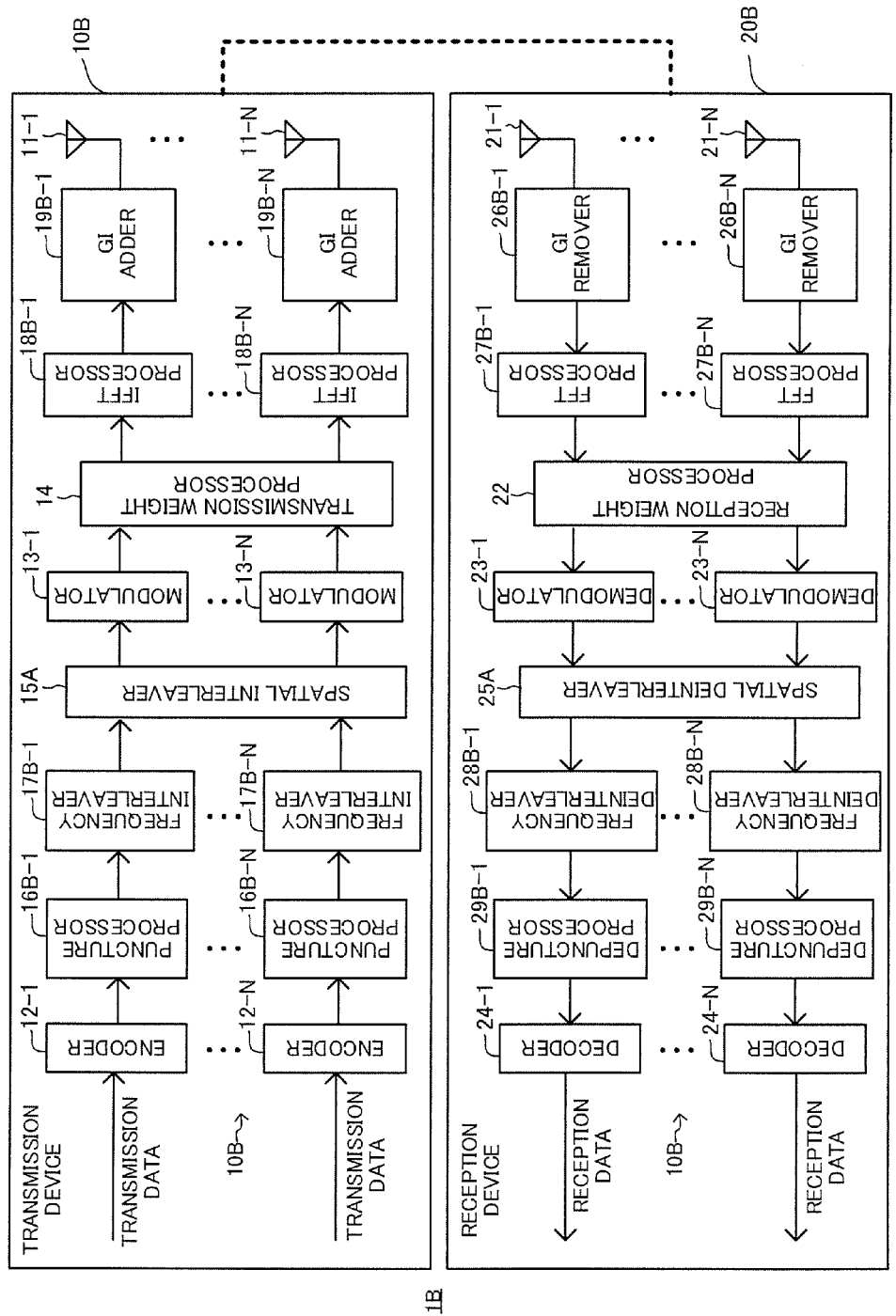
FIG. 11 is a view illustrating a configuration of a radio communication system according to a second modified example of the first embodiment.

As illustrated in FIG. 11, a radio communication system 1B according to the second modified example includes a transmission device 10B and a reception device 20B instead of the transmission device 10A and the reception device 20A.

The radio communication system 1B performs multi-carrier transmission in which a radio signal is transmitted through a plurality of carrier waves (in other words, sub carriers) having a plurality of different frequencies. In this example, the radio communication system 1B performs the multi-carrier transmission according to an orthogonal frequency-division multiplexing (OFDM) scheme.

The transmission device 10B includes a plurality of (N, in this example) puncture processors 16B-1, ..., and 16B-N and a plurality of (N, in this example) frequency interleavers 17B-1, ..., and 17B-N in addition to the configuration of the transmission device 10A. Further, the transmission device 10B includes a plurality of (N, in this example) inverse fast Fourier transform (IFFT) processors 18B-1, ..., and 18B-N and a plurality of (N, in this example) guard interval (GI) adders 19B-1, ..., and 19B-N.

The puncture processor 16B-i (i represents an integer from 1 to N) is referred to simply as a "puncture processor 16B" when the puncture processors need not be distinguished from each other. Similarly, the frequency interleaver 17B-i is referred to simply as a "frequency interleaver 17B" when the frequency interleavers need not be distinguished from each other. Similarly, the IFFT processor 18B-i is referred to simply as an "IFFT processor 18B" when the IFFT processors need not be distinguished from each other. Similarly, the GI adder 19B-i is referred to simply as a "GI adder 19B" when the GI adders need not be distinguished from each other.

The puncture processor 16B executes rate matching of causing the number of bits of the transmission data to match a certain number on the transmission data output from the encoder 12. For example, the rate matching includes a process (puncturing) of removing a bit or a process (repetition) of repeating a bit. The puncture processor 16B outputs the transmission data after the execution to the frequency interleaver 17B.

The frequency interleaver 17B executes frequency interleaving on the transmission data output from the puncture processor 16B. The frequency interleaving is a process of rearranging a plurality of data blocks allocated to a plurality of sub carriers such that a plurality of consecutive data blocks allocated to one sub carrier are allocated to a plurality of different sub carriers, respectively.

The frequency interleaver 17B outputs the transmission data after the execution to the spatial interleaver 15A.

The IFFT processor 18B converts a plurality of transmission signals output from the transmission weight processor 14 from the frequency domain to the time domain. The IFFT processor 18B outputs the converted transmission signal to the GI adder 19B.

The GI adder 19B adds a GI to the transmission signal output from the IFFY processor 18B. The GI adder 19B outputs the transmission signal after the addition to the transmission antenna 11.

In this example, the number of bits of a data block which is to be rearranged in the spatial interleaving is a predetermined rearrangement bit number. For example, the rearrangement bit number is 1, $N_{BPSC}$, or max ($N_{BPSC}/2$, 1). $N_{BPSC}$ represents the number of bits of data encoded for each sub carrier.

The reception device 20B includes a plurality of (N, in this example) GI removers 26B-1, . . . , and 26B-N and a plurality of (N, in this example) fast Fourier transform (FFT) processors 27B-1, . . . , and 27B-N in addition to the configuration of the reception device 20A. Further, the reception device 20B includes a plurality of (N, in this example) frequency deinterleavers 28B-1, . . . , and 28B-N and a plurality of (N, in this example) depuncture processors 29B-1, . . . , and 29B-N.

The GI remover 26B-i (i represents an integer from 1 to N) is referred to simply as a "GI remover 26B" when the GI removers need not be distinguished from each other. Similarly, the FFT processor 27B-i is referred to simply as an "FFT processor 27B" when the FFT processors need not be distinguished from each other. Similarly, the frequency deinterleaver 28B-i is referred to simply as a "frequency deinterleaver 28B" when the frequency deinterleavers need not be distinguished from each other. Similarly, the depuncture processor 29B-i is referred to simply as a "depuncture processor 29B" when the depuncture processors need not be distinguished from each other.

The GI remover 26B removes the GI from the reception signal received from the reception antenna 21. The GI remover 26B outputs the reception signal after the removal to the FFT processor 27B.

The FFT processor 27B converts the reception signal output from the GI remover 26B from the time domain to the frequency domain. The FFT processor 27B outputs the converted reception signal to the reception weight processor 22.

The frequency deinterleaver 28B executes frequency deinterleaving on the reception data output from the spatial deinterleaver 25A. The frequency deinterleaving is a process inverse to the frequency interleaving. The frequency deinterleaver 28B outputs the reception data after the execution to the depuncture processor 29B.

The depuncture processor 29B executes de-rate matching on the reception data output from the frequency deinterleaver 28B. The de-rate matching is a process inverse to the rate matching. The depuncture processor 29B outputs the reception data after the execution to the decoder 24.

The processes executed in the radio communication system 1A are executed in the radio communication system 1B for each of sub carriers in parallel. Thus, in this example, the transmission weight processor 14 pre-multiplies a plurality of modulation signals output from the plurality of modulators 13 by the transmission weight matrix for the respective sub carriers. In this example, the transmission weight processor 14 use the same transmission weight matrix for all sub carriers.

Similarly, in this example, the reception weight processor 22 pre-multiplies a plurality of reception signals output from the plurality of FFT processors 27B by the reception weight matrix for the respective sub carriers. In this example, the reception weight processor 22 uses the same reception weight matrix for all sub carriers.

As described above, in the radio communication system 1B according to the second modified example, in addition to the function of the radio communication system 1 according to the first embodiment, similarly to the radio communication system 1A according to the first modified example, the spatial interleaving is executed, and thus it is possible to reduce a possibility that information is hardly reconstructed based on the error correction code.

In the radio communication system 1B according to the second modified example, the spatial interleaver 15A may be arranged between the plurality of encoders 12 and the plurality of puncture processors 16B. Alternatively, the spatial interleaver 15A may be arranged between the plurality of puncture processors 16B and the plurality of frequency interleavers 17B. Alternatively, the spatial interleaver 15A may be arranged between the plurality of modulators 13 and the transmission weight processor 14.

Similarly, the spatial deinterleaver 25A may be arranged between the plurality of decoders 24 and the plurality of depuncture processors 29B. Alternatively, the spatial deinterleaver 25A may be arranged between the plurality of depuncture processors 29B and the plurality of frequency deinterleavers 28B. Alternatively, the spatial deinterleaver 25A may be arranged between the plurality of demodulators 23 and the reception weight processor 22.

Third Modified Example of First Embodiment

Next, a radio communication system according to a third modified example of the first embodiment will be described. The radio communication system according to the third modified example of the first embodiment is different from the radio communication system according to the second modified example of the first embodiment in that one encoder, one puncture processor, one decoder, and one depuncture processor are provided. Hereinafter, the difference will be mainly described. In the description of the third modified example of the first embodiment, elements having the same reference numerals as those used in the second modified example of the first embodiment are the same as or almost the same as those in the second modified example of the first embodiment.

Figure 12:
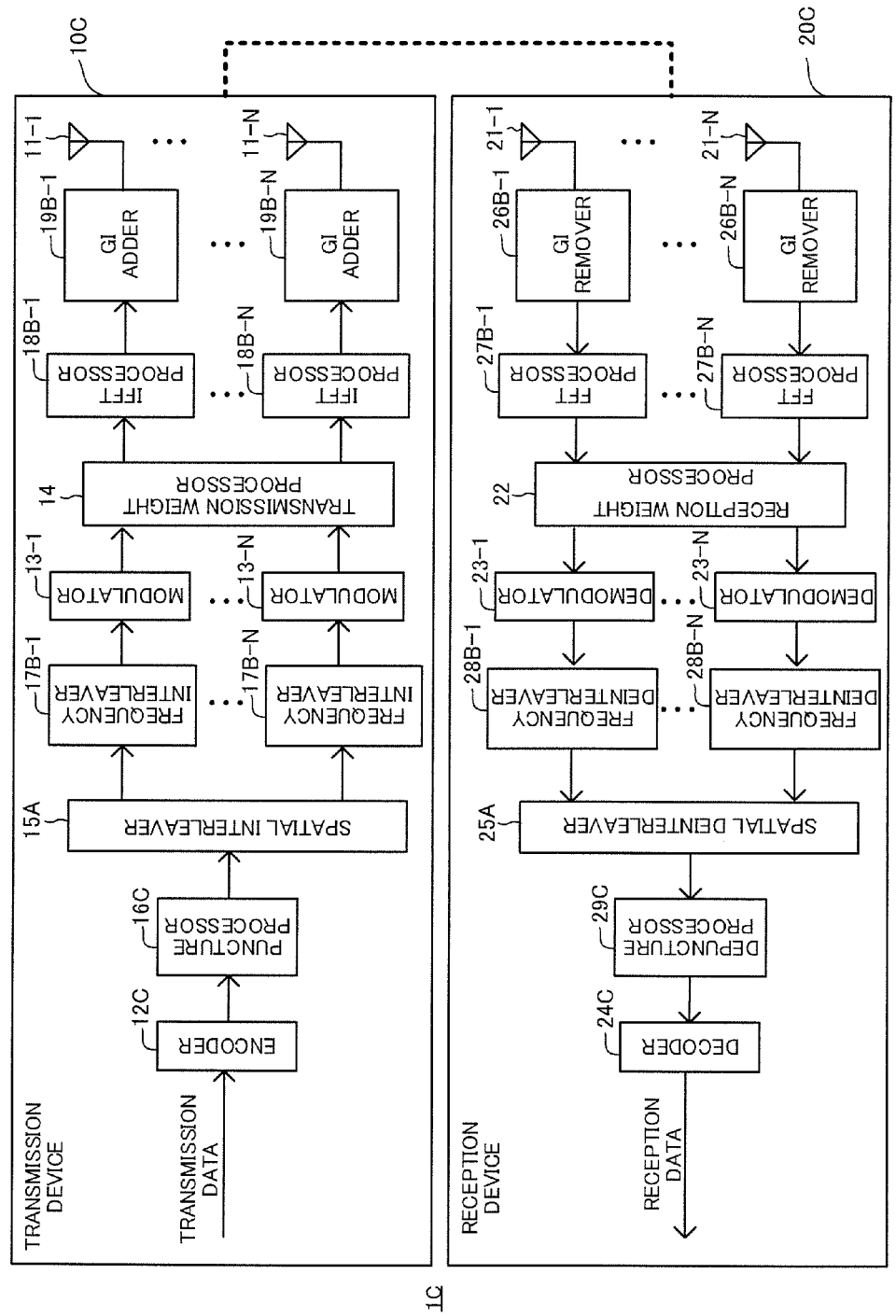
FIG. 12 is a view illustrating a configuration of a radio communication system according to a third modified example of the first embodiment.

As illustrated in FIG. 12, a radio communication system 10 according to the third modified example includes a transmission device 100 and a reception device 20C instead of the transmission device 10B and the reception device 20B.

The transmission device 100 includes one encoder 12C and one puncture processor 16C instead of the plurality of encoders 12 and the plurality of puncture processors 16B of the transmission device 10B. Further, the spatial interleaver 15A equipped in the transmission device 100 is arranged between the puncture processor 16C and the plurality of frequency interleavers 17B.

The encoder 12C executes the same process as the encoder 12. The encoder 12C outputs the transmission data after the execution to the puncture processor 160. the puncture processor 16C executes the same process as the puncture processor 16B. The puncture processor 16C outputs the transmission data after the execution to the spatial interleaver 15A.

The spatial interleaver 15A generates N stream signals by dividing the transmission data output from the puncture processor 16C by N. The spatial interleaver 15A executes the spatial interleaving on the generated N stream signals. The spatial interleaver 15A outputs plural pieces of transmission data after the execution to the plurality of frequency interleavers 17B.

The reception device 20C includes one decoder 24C and one depuncture processor 29C instead of the plurality of decoders 24 and the plurality of depuncture processors 29B of the reception device 20B. Further, the spatial deinterleaver 25A equipped in the reception device 20C is arranged between the depuncture processor 29C and the plurality of frequency deinterleavers 28B.

The spatial deinterleaver 25A executes the spatial deinterleaving on the plurality of the reception data output from the plurality of frequency deinterleavers 28B. The spatial deinterleaver 25A generates one stream signal by aggregating the plural pieces of the reception data after the execution. The spatial deinterleaver 25A outputs the reception data serving as the generated one stream signal to the depuncture processor 29C.

The depuncture processor 29C executes the same process as the depuncture processor 29B. The depuncture processor 29C outputs the reception data after the execution to the decoder 24C. The decoder 24C executes the same process as the decoder 24. The decoder 24C outputs the reception data after the execution.

As described above, in the radio communication system 10 according to the third modified example, in addition to the function of the radio communication system 1 according to the first embodiment, similarly to the radio communication system 1B according to the second modified example, the spatial interleaving is executed, and thus it is possible to reduce a possibility that information is hardly reconstructed based on the error correction code.

In addition, according to the radio communication system 10 according to the third modified example, one encoder, one puncture processor, one decoder, and one depuncture processor are provided, and thus a simpler configuration than that of the radio communication system 1B according to the second modified example can be provided.

Further, in the radio communication system 10 according to the third modified example, the spatial interleaver 15A may be arranged between the plurality of frequency interleavers 17B and the plurality of modulators 13. Alternatively, the spatial interleaver 15A may be arranged between the plurality of modulators 13 and the transmission weight processor 14.

Similarly, the spatial deinterleaver 25A may be arranged between the plurality of frequency deinterleavers 28B and the plurality of demodulators 23. Alternatively, the spatial deinterleaver 25A may be arranged between the plurality of demodulators 23 and the reception weight processor 22.

Second Embodiment

Next, a radio communication system according to a second embodiment will be described. The radio communication system according to the second embodiment is different from the radio communication system according to the first embodiment in that the position of the reception antenna is adjusted based on the channel capacity. Hereinafter, the difference will be mainly described. In the description of the second embodiment, elements having the same reference numerals as those used in the first embodiment are the same as or almost the same as those in the first embodiment.

Figure 13:
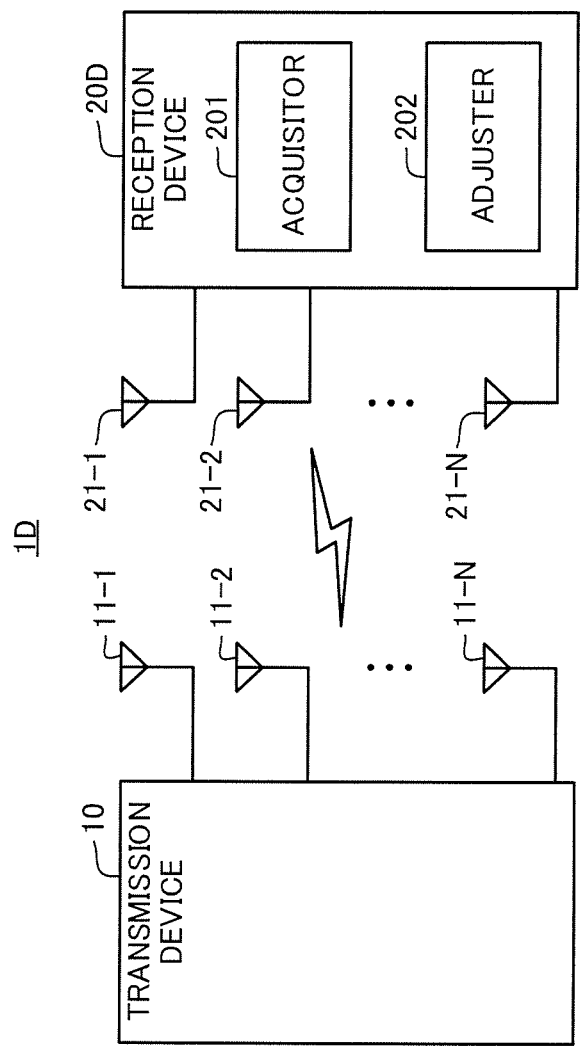
FIG. 13 is a view illustrating an example of a configuration of a radio communication system according to a second embodiment.

A radio communication system 1D according to the second embodiment includes a reception device 20D instead of the reception device 20 of FIG. 1 as illustrated in FIG. 13.

The reception device 20D includes an acquisitor 201 and an adjuster 202 in addition to the configuration of the reception device 20. The acquisitor 201 and the adjuster 202 may be equipped in the reception devices 20A to 20C of the radio communication systems 1A to 10.

The acquisitor 201 acquires information (the channel information) indicating the channel capacity between the plurality of transmission antennas 11 and the plurality of reception antennas 21. For example, the acquisitor 201 acquires the channel information by acquiring an amount of properly received information per unit time based on an error rate in the decoder 24.

The acquisitor 201 may acquire the channel information by estimating the channel information based on communication state information indicating a communication state. For example, the communication state information is a reference signal received power (RSRP), an SINR, a path loss, a channel quality indicator (CQI), and/or a reference signal received quality (RSRQ).

The adjuster 202 adjusts the positions of the plurality of reception antennas 21 based on the channel information acquired by the acquisitor 201. In this example, the adjuster 202 adjusts the positions of the plurality of reception antennas 21 so that the channel capacity indicated by the channel information has a maximum value.

As an example, the adjuster 202 adjusts the offset angle θ by rotating the plurality of reception antennas 21 relative to the plurality of transmission antennas 11. As another example, the adjuster 202 adjusts the inter-center distance R by shifting the plurality of reception antennas 21 in a direction perpendicular to the second circle C2. As still another example, the adjuster 202 adjusts the diameter $d_r$ of the second circle C2 by shifting the plurality of reception antennas 21 in a radial direction of the second circle C2.

The adjuster 202 may adjust any one or any combination of the offset angle θ, the inter-center distance R, and the diameter $d_r$.

As described above, according to the radio communication system 1D according to the second embodiment, similarly to the radio communication system 1 according to the first embodiment, the plurality of transmission antennas 11 and the plurality of reception antennas 21 are arranged such that the channel matrix $H_{cir}$ is the circulant matrix.

Accordingly, the communication process can be simplified.

Further, according to the radio communication system 1D according to the second embodiment, the positions of the plurality of reception antennas 21 is adjusted based on the information indicating the channel capacity. As a result, it is possible to reliably increase the channel capacity.

In the radio communication system 1D according to the second embodiment, the positions of some reception antennas 21 among the plurality of reception antennas 21 may be adjusted. Alternatively, in the radio communication system 1D according to the second embodiment, both the positions of the plurality of reception antennas 21 and the positions of the plurality of transmission antennas 11 may be adjusted. Alternatively, in the radio communication system 1D according to the second embodiment, only the positions of the plurality of transmission antennas 11 may be adjusted.

When the positions of the plurality of transmission antennas 11 are adjusted, the reception device 20D may transmit the channel information to the transmission device 10. In this case, the transmission device 10 may adjust the positions of the plurality of transmission antennas 11 based on the received channel information.

Third Embodiment

Next, a radio communication system according to a third embodiment will be described. The radio communication system according to the third embodiment is different from the radio communication system according to the first embodiment in that the pre-coding is not performed. Hereinafter, the difference will be mainly described. In the description of the third embodiment, elements having the same reference numerals as those used in the first embodiment are the same as or almost the same as those in the first embodiment.

Figure 14:
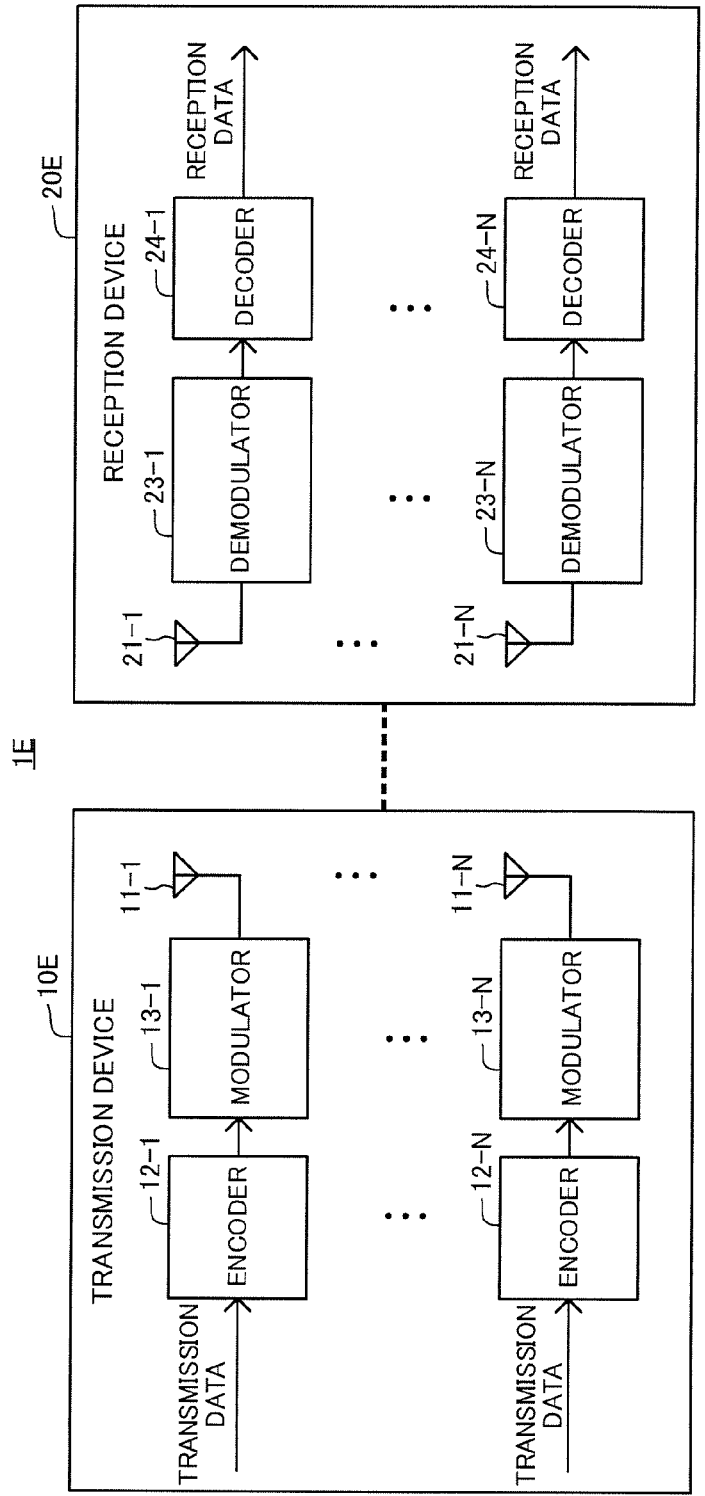
FIG. 14 is a view illustrating an example of a configuration of a radio communication system according to a third embodiment.

As illustrated in FIG. 14, a radio communication system 1E according to the third embodiment includes a transmission device 10E and a reception device 20E instead of the transmission device 10 and the reception device 20 of FIG. 1.

The transmission device 10E has a configuration in which the transmission weight processor 14 is removed from the configuration of the transmission device 10.

The reception device 20E has a configuration in which the reception weight processor 22 is removed from the configuration of the reception device 20.

Thus, the transmission device 10E transmits the pre-process signal through the plurality of transmission antennas 11 as the transmission signal without pre-multiplying the pre-process signal by the transmission weight matrix.

Further, the reception device 20E outputs the reception signal as the post-process signal without pre-multiplying the reception signal received by the plurality of reception antennas 21 by the reception weight matrix.

In the radio communication system 1E according to the third embodiment, the plurality of transmission antennas 11 and the plurality of reception antennas 21 are arranged such that the inter-center distance R, the diameter $d_t$ of the first circle C1, and the diameter $d_r$ of the second circle C2 satisfy the relation expressed by Mathematical Formula 51 or Mathematical Formula 52. Thus, the radio communication system 1E can increase the channel capacity to be larger than when the inter-center distance R, the diameter $d_t$ of the first circle C1, and the diameter $d_r$ of the second circle C2 do not satisfy the relation.

Fourth Embodiment

A relation among a radio signal (in other words, a transmission signal) x transmitted through a transmission antenna, a radio signal (in other words, a reception signal) y received through a reception antenna, and a noise n included in the reception signal y is expressed as in Mathematical Formula 53.

$y=Hx+n$ [Mathematical Formula 53]

x represents a vector (in other words, a transmission signal vector) of Nt×1. Nt represents the number of transmission antennas. n represents a vector (in other words, a noise vector) of Nr×1. Nr represents the number of reception antennas. y represents a vector (in other words, a reception signal vector) of Nr×1. H represents a matrix (in other words, a channel matrix) of Nr×Nt. A channel matrix is a matrix having a channel response (in other words, a channel impulse response) between an i-th reception antenna and a j-th transmission antenna as an element of an i-th row and a j-th column. i represents an integer from 1 to Nr. j represents an integer from 1 to Nt.

In the reception signal process of the MIMO scheme, the transmission signal x separated for each data stream is estimated from the spatially multiplexed reception signal y. The estimating of the transmission signal x is performed using a zero forcing (ZF) technique, a minimum mean square error (MMSE) technique, or the like. Each of the ZF technique and the MMSE technique includes a process of calculating an inverse matrix of a channel matrix.

The estimating of the transmission signal x may be performed using a Bell Lab. Layered Space-Time (BLAST) technique, a maximum likelihood detection (MLD) technique, or the like. Each of the BLAST technique and the MLD technique is larger in an amount of computation than the ZF technique or the MMSE technique.

For example, when the ZF technique is used, an estimation value $x_e$ of the transmission signal x is calculated by pre-multiplying the reception signal y by a filter matrix $G_{ZF}$ as expressed in Mathematical Formula 54. The filter matrix $G_{ZF}$ is a matrix of Nt×Nr.

$x_e=G_{ZF}y=G_{ZF}Hx+G_{ZF}n$ [Mathematical Formula 54]

The filter matrix $G_{ZF}$ is expressed using the channel matrix H as in Mathematical Formula 55.

$=G_{ZF}=(H^H H)^{-1}H^H$ [Mathematical Formula 55]

When the number of transmission antennas is equal to the number of reception antennas, $G_{ZF}=H^{-1}$ is held, and thus the estimation value $x_e$ of the transmission signal x is expressed as in Mathematical Formula 56.

$x_e=G_{ZF}y=H^{-1}y$ [Mathematical Formula 56]

An amount of computation for calculating an inverse matrix $H^{-1}$ of the matrix H increases in proportion to the cube of the number N of antennas. The number N of antennas is the number of transmission antennas or the number of reception antennas. Further, an amount of computation for post-multiplying the matrix $H^{-1}$ by the reception signal y increases in proportion to the square of the number N of antennas. Thus, the amount of computation for calculating the estimation value $x_e$ of the transmission signal x based on Mathematical Formula 56 is expressed as in Mathematical Formula 57. Hereinafter, the amount of computation for calculating the estimation value $x_e$ of the transmission signal x is also referred to as "complexity." O(X) represents a function indicating that the amount of computation increases in proportion to X.

$O(N^3)+O(N^2)$ [Mathematical Formula 57]

Similarly, when the MMSE technique is used, a filter matrix $G_{MMSE}$ is expressed as in Mathematical Formula 58. γ represents a parameter indicating a noise and expressed as in Mathematical Formula 59. γ represents an average value of signal to noise ratios (SNRs) on all the reception antennas. I represents an identity matrix.

$G_{MMSE}=(H^H H+\gamma I)^{-1}H^H$ [Mathematical Formula 58]

$\gamma=\dfrac{Nt}{\rho}$ [Mathematical Formula 59]

When the MMSE technique is used, the amount of computation for calculating the estimation value $x_e$ of the transmission signal x from Mathematical Formula 58 is an amount obtained by adding the amount of computation for calculating the parameter γ to the amount of computation expressed by Mathematical Formula 57.

As described above, even when any of the ZF technique and the MMSE technique is used, the amount of computation for calculating the estimation value $x_e$ of the transmission signal x is likely to increase since a calculation of an inverse matrix is performed.

On the other hand, as will be described later, in the radio communication system according to the fourth embodiment, inverse discrete Fourier transform is executed on reception signals received through a plurality of reception antennas, the execution result is pre-multiplied by a diagonal matrix, and discrete Fourier transform is executed on the multiplication result. Through this operation, in the radio communication system, transmission signals transmitted through a plurality of transmission antennas are estimated. As a result, the amount of computation for estimating the transmission signal can be reduced.

The radio communication system according to the fourth embodiment is different from the radio communication system according to the first embodiment in that a reception device estimates a transmission signal without performing the pre-coding. Hereinafter, the difference will be mainly described. In the description of the fourth embodiment, elements having the same reference numerals as those used in the first embodiment are the same as or almost the same as those in the first embodiment.

Figure 15:
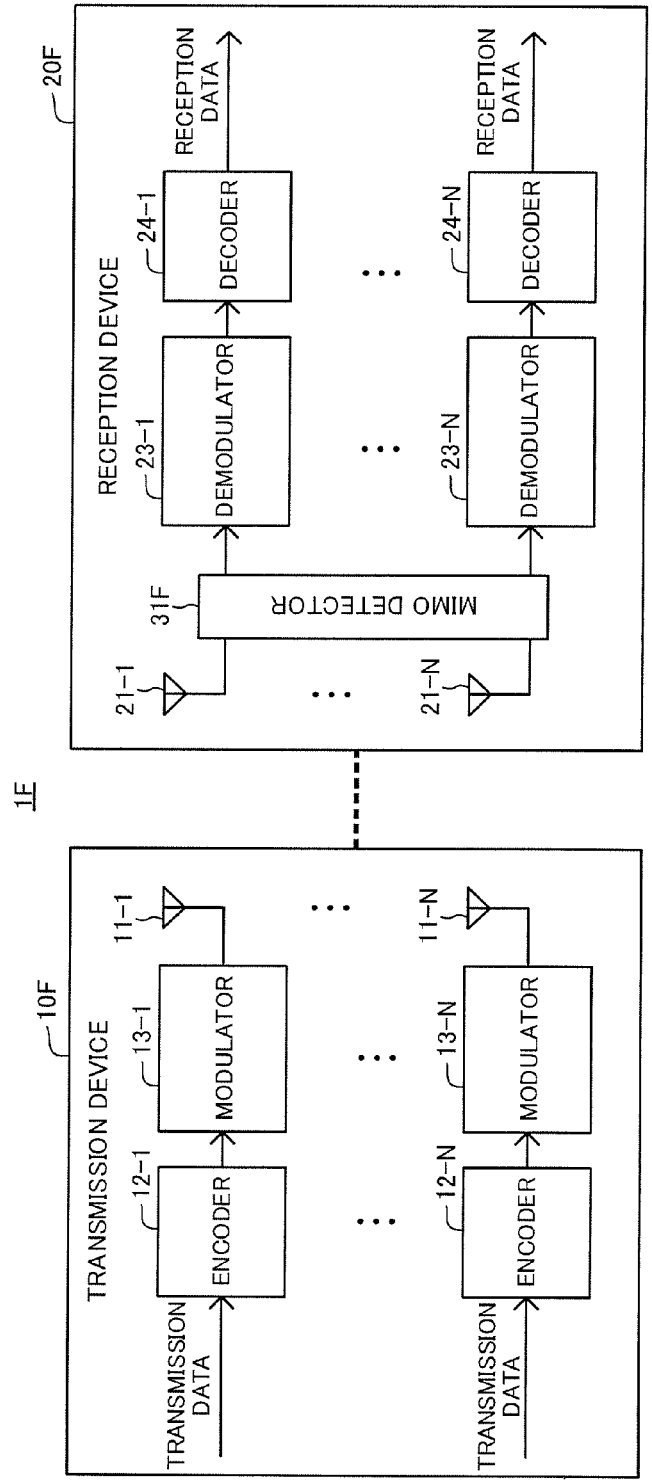
FIG. 15 is a view illustrating an example of a configuration of a radio communication system according to a fourth embodiment.

As illustrated in FIG. 15, a radio communication system 1F according to the fourth embodiment includes a transmission device 10F and a reception device 20F instead of the transmission device 10 and the reception device 20 of FIG. 7.

The transmission device 10F has a configuration in which the transmission weight processor 14 is removed from the transmission device 10 of FIG. 7. The transmission device 10F transmits the modulation signal through the plurality of transmission antennas 11 as the transmission signal without pre-multiplying the modulation signal output from the modulator 13 by the transmission weight matrix.

The reception device 20F includes a MIMO detector 31F instead of the reception weight processor 22 of the reception device 20 of FIG. 7. The MIMO detector 31F performs MIMO detection on the reception signals received through the plurality of reception antennas 21. The MIMO detection includes a process of estimating the transmission signal transmitted from the transmission device 10F based on the reception signal. The MIMO detector 31F outputs the execution result of the MIMO detection to the demodulator 23.

In this example, similarly to the first embodiment, the number of transmission antennas 11-1, 11-2, ..., and 11-N is equal to the number of reception antennas 21-1, 21-2, ..., and 21-N.

In this example, similarly to the first embodiment, in the radio communication system 1F, the plurality of transmission antennas 11 and the plurality of reception antennas 21 are arranged such that the channel matrix $H_{cir}$ is the circulant matrix. Thus, similarly to the first embodiment, there are a diagonal matrix ψ, a first matrix F, and a second matrix $F^H$ that have relations expressed by Mathematical Formula 60 and Mathematical Formula 61 on the channel matrix $H_{cir}$. The second matrix $F^H$ is a complex conjugate transposed matrix of the first matrix F. The diagonal matrix ψ is an example of a second diagonal matrix.

$$H_{cir} = F\Psi F^H \quad \text{[Mathematical Formula 60]}$$

$$\Psi = F^H H_{cir} F \quad \text{[Mathematical Formula 61]}$$

A diagonal element $\psi_p$ that that is an element of a p-th row and a p-th column of the diagonal matrix ψ is expressed as in Mathematical Formula 62. p represents an integer from 1 to N. N represents an integer of 2 or more indicating the number of antennas. $h_{mn}$ represents a channel response between an m-th reception antenna 21-$m$ and an n-th transmission antenna 11-$n$. The channel response $h_{mn}$ is an element of an m-th row and an n-th column in the channel matrix $H_{cir}$.

$$\psi_p = \sum_{q=1}^{N} h_{1q} e^{-j\frac{2\pi}{N}(p-1)(q-1)} \quad \text{[Mathematical Formula 62]}$$

A relation between the diagonal element $\psi_p$ of the diagonal matrix ψ and an eigenvalue $\lambda_p$ of a matrix $H_{cir}^H H_{cir}$ or a matrix $H_{cir} H_{cir}^H$ is expressed as in Mathematical Formula 63.

$$\lambda_p = |\psi_p|^2 \quad \text{[Mathematical Formula 63]}$$

An element $f_{mn}$ of an m-th row and an n-th column of the first matrix F is expressed as in Mathematical Formula 64. As can be understood from Mathematical Formula 64, the first matrix F changes depending on only the number N of antennas. In other words, even when the channel matrix $H_{cir}$ has been changed, the first matrix F is constant as long as the channel matrix $H_{cir}$ is the circulant matrix.

$$f_{mn} = \frac{1}{\sqrt{N}} \exp\left(-\frac{2\pi}{N} j(m-1)(n-1)\right) \quad \text{[Mathematical Formula 64]}$$

As can be understood from Mathematical Formula 64, the first matrix F is a unitary matrix. Thus, Mathematical Formula 65 is held. I represents an identity matrix.

$$F^H F = FF^H = I \quad \text{[Mathematical Formula 65]}$$

The inverse matrix $H_{cir}^{-1}$ of the channel matrix $H_{cir}$ is expressed as in Mathematical Formula 66.

$$H_{cir}^{-1} = F\Psi^{-1} F^H \quad \text{[Mathematical Formula 66]}$$

When the ZF technique is used, the estimation value $x_e$ of the transmission signal x is expressed as in Mathematical Formula 67 derived from Mathematical Formula 66. In this example, $x_e$ represents a vector of N×1. A p-th element of the vector $x_e$ represents an estimation value of a transmission signal transmitted through a p-th transmission antenna 11-$p$. y represents a vector of N×1. A p-th element of the vector y represents a reception signal received through a p-th reception antenna 21-$p$. p represents an integer from 1 to N.

$$x_e = G_{ZF} y = H_{cir}^{-1} y = F\Psi^{-1} F^H y \quad \text{[Mathematical Formula 67]}$$

In this example, the MIMO detector 31F calculates the estimation value $x_e$ of the transmission signal x based on Mathematical Formula 67. The calculating of the estimation value $x_e$ of the transmission signal x is an example of the estimating of the transmission signal x.

Figure 16:
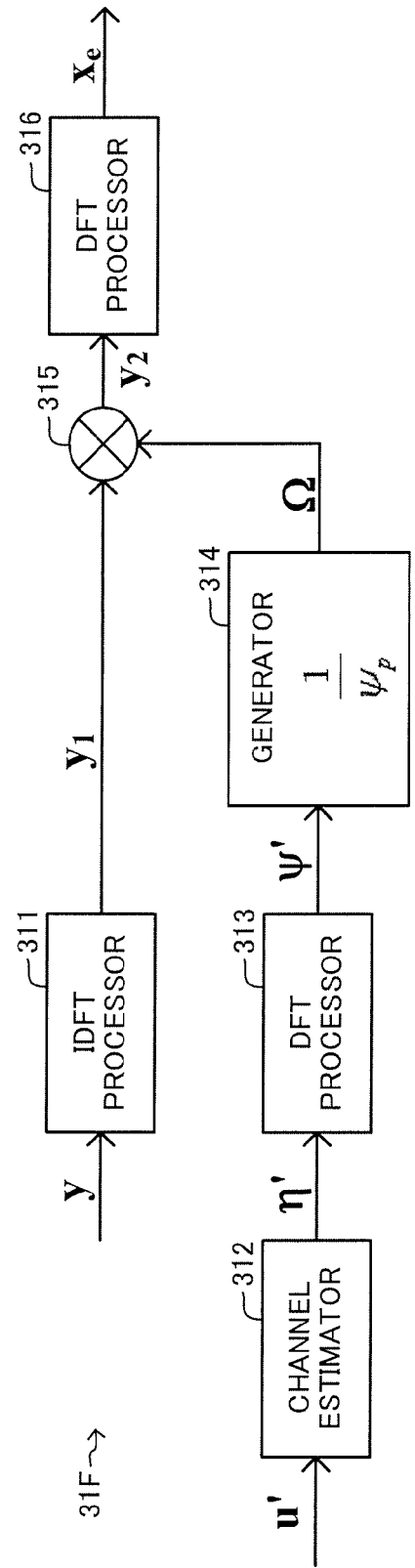
FIG. 16 is a view illustrating an example of a configuration of a MIMO detector illustrated in FIG. 15.

The MIMO detector 31F includes an inverse discrete Fourier transform (IDFT) processor 311, a channel estimator 312, a discrete Fourier transform (DFT) processor 313, a generator 314, a multiplier 315, and a DFT processor 316 as illustrated in FIG. 16 as an example.

The channel estimator 312 holds a known transmission signal $u_0$. The known transmission signal is predetermined. For example, the known transmission signal $u_0$ is a preamble signal or a pilot signal.

The transmission device 10F transmits the known transmission signal $u_0$ through one of the plurality of transmission antennas 11. In this example, the transmission device 10F transmits the known transmission signal $u_0$ through the first transmission antenna 11-1. The transmission device 10F may transmit the known transmission signal $u_0$ through one transmission antenna 11 other than the first transmission antenna 11-1.

As a result, the reception device 20F receives the signal, which is transmitted through one transmission antenna 11, as the reception signal through the plurality of reception antennas 21.

The channel estimator 312 calculates an estimation value $\eta_p$ of a channel response based on a reception signal $u_p'$ and the known transmission signal $u_0$ being held in advance for each of the plurality of reception antennas 21. In this example, $\eta_p$ represents an estimation value of a channel response between the first transmission antenna 11-1 and the p-th reception antenna 21-$p$. p represents an integer from 1 to N. $u_p'$ represents a reception signal of the p-th reception antenna 21-$p$.

In this example, the channel estimator 312 calculates an estimation value $\eta_p$ of the channel response by dividing the reception signal $u_p'$ of the p-th reception antenna 21-$p$ by the known transmission signal $u_0$ as expressed in Mathematical Formula 68. $n_p$ represents a noise included in the reception signal $u_p'$ of the p-th reception antenna 21-$p$.

$$\eta_p = \frac{u_p'}{u_0} = h_{p1} + \frac{n_p}{u_0} \qquad \text{[Mathematical Formula 68]}$$

The channel estimator 312 acquires an estimation value vector $\eta'$ of the channel response based on the calculated estimation value $\eta_p$ of the channel response. The estimation value vector $\eta'$ of the channel response includes the estimation value of the channel response between one of the plurality of reception antennas 21 and the plurality of transmission antennas 11.

In this example, the channel estimator 312 acquires the estimation value vector $\eta'$ of the channel response between the plurality of transmission antennas 11 and the first reception antenna 21-1 based on the estimation value $\eta_p$ of the channel response and Mathematical Formula 69. The channel estimator 312 may acquire the estimation value vector of the channel response for one reception antenna 21 other than the first reception antenna 21-1. The channel estimator 312 outputs the acquired estimation value vector $\eta'$ of the channel response to the DFT processor 313.

$$\eta' = [\eta_1, \eta_N, \eta_{N-1}, \ldots \eta_2] \qquad \text{[Mathematical Formula 69]}$$

The DFT processor 313, by executing discrete Fourier transform (DFT) on the estimation value vector $\eta'$ of the channel response output from the channel estimator 312, calculates the diagonal element vector $\psi'$ of the diagonal matrix $\psi$ as in Mathematical Formula 70. The diagonal element vector $\psi'$ of the diagonal matrix $\psi$ includes the diagonal element $\psi_p$ of the diagonal matrix $\psi$. DFT(X) represents DFT for X.

$$\psi' = DFT(\eta') = \sqrt{N} F \eta' \qquad \text{[Mathematical Formula 70]}$$

Thus, the diagonal element $\psi_p$ of the diagonal matrix $\psi$ can be calculated by performing the DFT. Thus, the amount of computation for calculating the diagonal element $\psi_p$ of the diagonal matrix $\psi$ can be reduced.

The DFT processor 313 outputs the calculated diagonal element vector $\psi'$ to the generator 314. In this example, the DFT processor 313 executes the DFT by performing the FFT. Accordingly, the amount of computation for performing the DFT can be reduced. As a result, the DFT can be executed at a high speed. Alternatively, the DFT processor 313 may execute the DFT without performing the FFT.

The generator 314 generates a diagonal matrix $\Omega$ based on the diagonal element vector $\psi'$ output from the DFT processor 313. A diagonal element $\omega_p$ that is an element of a p-th row and a p-th column of the diagonal matrix $\Omega$ is calculated as in Mathematical Formula 71. In this example, the diagonal matrix $\Omega$ is identical to an inverse matrix $\psi^{-1}$ of the diagonal matrix $\psi$. The generator 314 outputs the generated diagonal matrix $\Omega$ to the multiplier 315. The diagonal matrix $\Omega$ is an example of a first diagonal matrix.

$$\omega_p = \frac{1}{\psi_p} \qquad \text{[Mathematical Formula 71]}$$

The IDFT processor 311 calculates a vector $y_1$ after first conversion by executing the IDFT on the reception signal y as in Mathematical Formula 72. IDFT(X) is IDFT for X.

$$y_1 = IDFT(y) = \frac{F^H y}{\sqrt{N}} \qquad \text{[Mathematical Formula 72]}$$

The IDFT processor 311 outputs the calculated vector $y_1$ after the first conversion to the multiplier 315. In this example, the IDFT processor 311 executes the IDFT by performing the FFT. Accordingly, the amount of computation for performing the IDFT can be reduced. As a result, the IDFT can be executed at a high speed. Alternatively, the IDFT processor 311 may execute the IDFT without performing the FFT.

The multiplier 315 calculates a vector $y_2$ after second conversion by pre-multiplying the vector $y_1$ output from the IDFT processor 311 by the diagonal matrix $\Omega$ (in this example, $\Omega = \psi^{-1}$) output from the generator 314 as in Mathematical Formula 73. The multiplier 315 outputs the calculated vector $y_2$ after the second conversion to the DFT processor 316.

$$y_2 = \Psi^{-1} y_1 \qquad \text{[Mathematical Formula 73]}$$

The DFT processor 316 calculates a vector $y_3$ after third conversion by executing the DFT on the vector $y_2$ after the second conversion as in Mathematical Formula 74. The DFT processor 316 outputs the calculated vector $y_3$ after the third conversion as the estimation value $x_e$ of the transmission signal x. In this example, the DFT processor 316 executes the DFT by performing the FFT. Accordingly, the amount of computation for performing the DFT can be reduced. As a result, the DFT can be executed at a high speed. Alternatively, the DFT processor 316 may execute the DFT without performing the FFT.

$$y_3 = DFT(y_2) = \sqrt{N} F y_2 \qquad \text{[Mathematical Formula 74]}$$

As described above, in this example, the MIMO detector 31F calculates the estimation value $x_e$ of the transmission signal x by performing an operation equivalent to Mathematical Formula 67 as expressed in Mathematical Formula 75.

$$\begin{aligned} y_3 &= \sqrt{N} F y_2 \\ &= \sqrt{N} F \Psi^{-1} y_1 \\ &= \sqrt{N} F \Psi^{-1} \frac{F^H y}{\sqrt{N}} \\ &= F \Psi^{-1} F^H y \end{aligned} \qquad \text{[Mathematical Formula 73]}$$

The amount of computation for executing the DFT or the IDFT without performing the FFT increases in proportion to the square of the number N of antennas. For example, a case in which all the IDFT processor 311, the DFT processor 313, and the DFT processor 316 execute the DFT or the IDFT without performing the FFT is considered. In this case, the amount of computation for calculating the estimation value $x_e$ of the transmission signal x is expressed as in Mathematical Formula 76.

$$O(N^2)+O(N^2)+O(N)+O(N^2)= 3O(N^2)+O(N) \quad \text{[Mathematical Formula 76]}$$

The amount of computation for executing the DFT or the IDFT by performing the FFT increases in proportion to N $\log_2 N$. For example, a case in which all the IDFT processor 311, the DFT processor 313 and the DFT processor 316 execute the DFT or the IDFT by performing the FFT is considered. In this case, the amount of computation for calculating the estimation value $x_e$ of the transmission signal x is expressed as in Mathematical Formula 77.

$$O(N \log_2 N)+O(N \log_2 N)+O(N)+ O(N \log_2 N)=3O(N \log_2 N)+O(N) \quad \text{[Mathematical Formula 77]}$$

Figure 17:
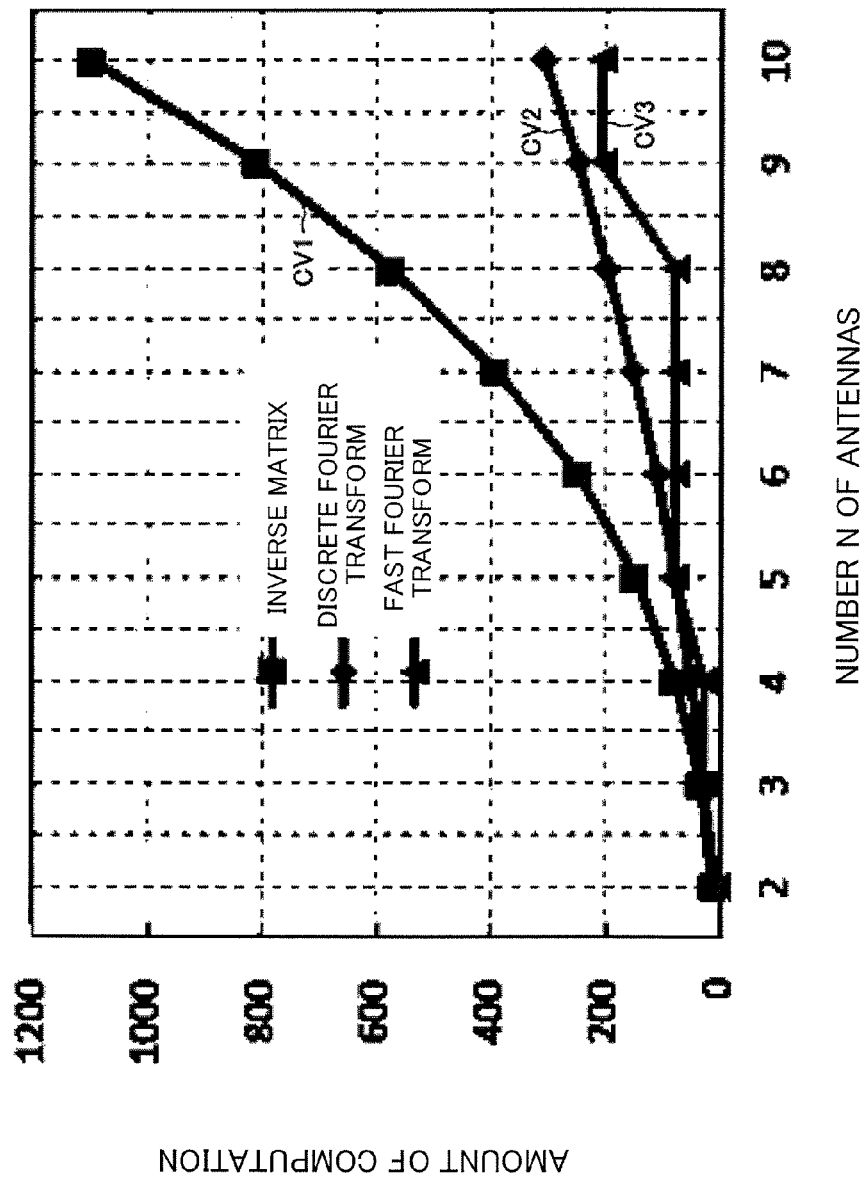
FIG. 17 is a graph illustrating an example of a relation between an amount of computation and the number of antennas according to the fourth embodiment.

FIG. 17 illustrates an example of the amount of computation for calculating the estimation value $x_e$ of the transmission signal x. In FIG. 17, a curved line CV1 represents an amount of computation when the inverse matrix $H^{-1}$ is calculated from the channel matrix H. In FIG. 17, a curved line CV2 represents an amount of computation when the DFT and the IDFT are executed without performing the FFT. In FIG. 17, a curved line CV3 represents an amount of computation when the DFT and the IDFT are executed by performing the FFT.

The FFT can be applied to data pieces of a number of a power of 2. Thus, when the FFT is performed, the amount of computation when the number N of antennas is 3 is substantially equal to the amount of computation when the number N of antennas is 4. Similarly, when the FFT is performed, the amount of computation when the number N of antennas is 5, 6, or 7 is substantially equal to the amount of computation when the number N of antennas is 8. Similarly, when the FFT is performed, the amount of computation when the number N of antennas is any of 9 to 15 is substantially equal to the amount of computation when the number N of antennas is 16.

As illustrated in FIG. 17, the amount of computation when the DFT and the IDFT are executed is smaller than the amount of computation when the inverse matrix $H^{-1}$ is calculated from the channel matrix H. Further, a difference between the amount of computation when the DFT and the IDFT are executed and the amount of computation when the inverse matrix $H^{-1}$ is calculated from the channel matrix H increases as the number N of antennas increases.

(Operation)

Next, an example of an operation of the radio communication system 1F will be described.

The transmission device 10F holds a known transmission signal in advance. Similarly, the reception device 20F holds the known transmission signal in advance.

First, the transmission device 10F modulates the known transmission signal, and transmits the modulated known transmission signal through one transmission antenna 11-1. As a result, the reception device 20F receives the signal, which is transmitted through one transmission antenna 11-1, as the reception signal through the plurality of reception antennas 21.

Then, the reception device 20F acquires the estimation value vector η' of the channel response based on the reception signal and the known transmission signal being held in advance. Then, the reception device 20F calculates the diagonal element vector ψ' of the diagonal matrix ψ by executing the DFT on the acquired estimation value vector η' of the channel response. Thereafter, the reception device 20F generates the diagonal matrix Ω based on the calculated diagonal element vector ψ' of the diagonal matrix ψ.

The transmission device 10F adds an error correction code to the transmission data, modulates the transmission data after the addition, and transmits the modulation signal as the transmission signal through the plurality of transmission antennas 11. As a result, the reception device 20F receives the signals, which are transmitted from the plurality of transmission antennas 11, as the reception signal through the plurality of reception antennas 21.

Then, the reception device 20F calculates the vector $y_1$ after the first conversion by executing the IDFT on the reception signal y. Then, the reception device 20F calculates the vector $y_2$ after the second conversion by pre-multiplying the calculated vector $y_1$ after the first conversion by the generated diagonal matrix Ω (in this example, $\Omega = \psi^{-1}$).

Further, the reception device 20F calculates the vector $y_3$ after the third conversion as the estimation value $x_e$ of the transmission signal x by executing the DFT on the calculated vector $y_2$ after the second conversion. Then, the reception device 20F demodulates the calculated estimation value $x_e$ of the transmission signal x, and executes the error correction process on the demodulated data. Then, the reception device 20F acquires the data that has been subjected to the error correction process as data transmitted from the transmission device 10F.

As described above, in the radio communication system 1F according to the fourth embodiment, the IDFT is executed on the reception signals received through the plurality of reception antennas 21, and the execution result is pre-multiplied by the diagonal matrix Ω. Further, in the radio communication system 1F, the transmission signals x transmitted through the plurality of transmission antennas 11 are estimated by executing the DFT on the multiplication result.

Accordingly, the amount of computation for estimating the transmission signal x can be reduced.

Further, in the radio communication system 1F according to the fourth embodiment, the transmission signal $x_e$ is estimated as in Mathematical Formula 67.

Accordingly, an operation of pre-multiplying the vector by the second matrix $F^H$ by performing the IDFT can be performed. Further, an operation of pre-multiplying the vector by the first matrix F by performing the DFT can be performed. Thus, the amount of computation for estimating the transmission signal x can be reduced.

In addition, in the radio communication system 1F according to the fourth embodiment, the element $\psi_p$ of the diagonal matrix ψ is estimated based on the reception signals $u_p'$ obtained by receiving the known transmission signal $u_0$, which is transmitted through one transmission antenna 11-1, through the plurality of reception antennas 21.

Accordingly, it is possible to estimate the transmission signal x by estimating the channel response between one transmission antenna 11-1 and the plurality of reception antennas 21. Thus, the amount of computation for estimating the transmission signal x can be reduced to be smaller than when the channel responses between the plurality of transmission antennas 11 and the plurality of reception antennas 21 are estimated.

When there is interference between data streams due to a multipath or the like, the reception device 20F may estimate the channel responses between the plurality of transmission antennas 11 and the plurality of reception antennas 21 based on the known transmission signal transmitted through the plurality of transmission antennas 11. In this case, the reception device 20F may acquire the channel matrix based on the estimated channel responses, calculate an inverse matrix of the acquired channel matrix from the channel matrix, and estimate the transmission signal based on the calculated inverse matrix.

Meanwhile, as described above, when the number N of antennas is 3, the diameter $d_t$ of the first circle C1 is equal to the diameter $d_r$ of the second circle C2, and the offset angle θ is 0°, the signal-to-interference plus noise ratio $SINR_p$ is expressed as in Mathematical Formula 41. p represents an integer from 1 to 3.

Figure 18:
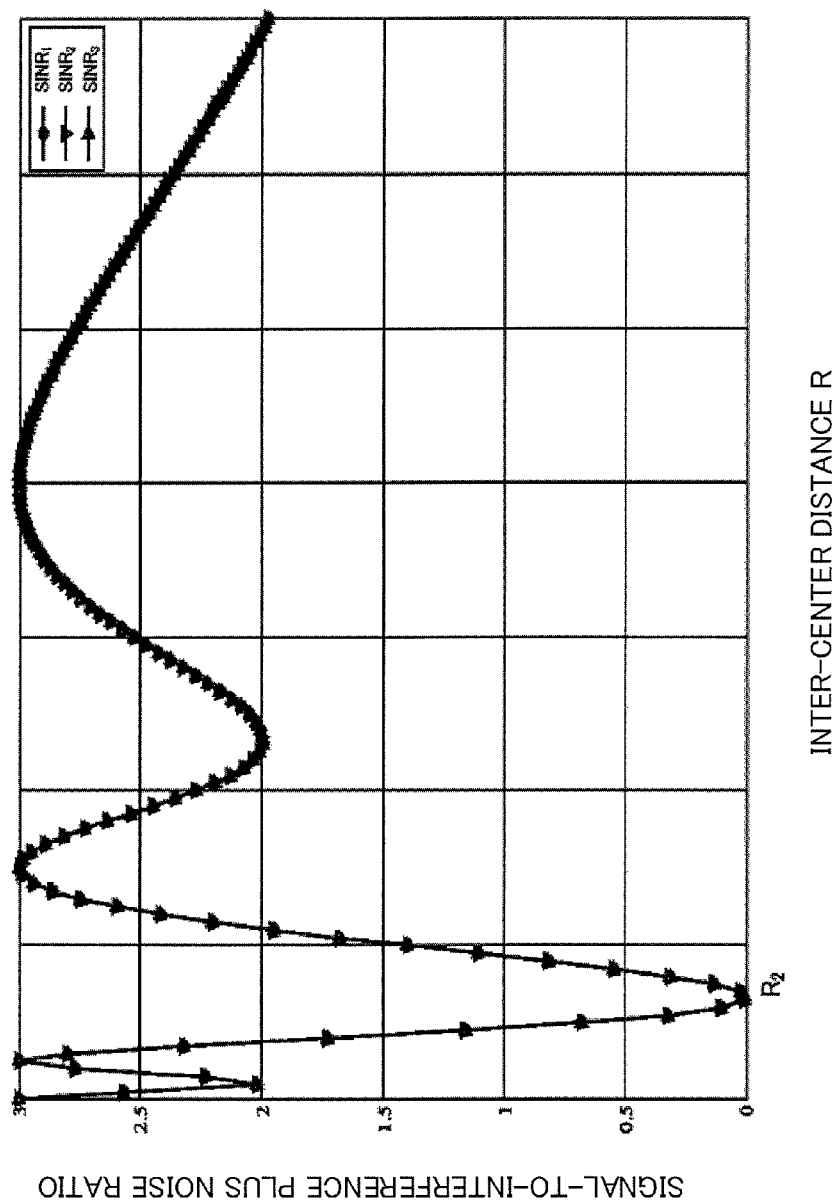
FIG. 18 is a graph illustrating an example of a relation between a signal-to-interference noise ratio and an inter-center distance of a circle on which transmission and reception antennas are arranged according to the fourth embodiment.

The signal-to-interference plus noise ratios $SINR_p$s are identical to one another as illustrated in FIG. 18. As illustrated in FIG. 18, when the inter-center distance R is a certain distance $R_2$, the signal-to-interference plus noise ratio $SINR_p$ is 0. In this case, it may be difficult to perform communication.

Figure 19:
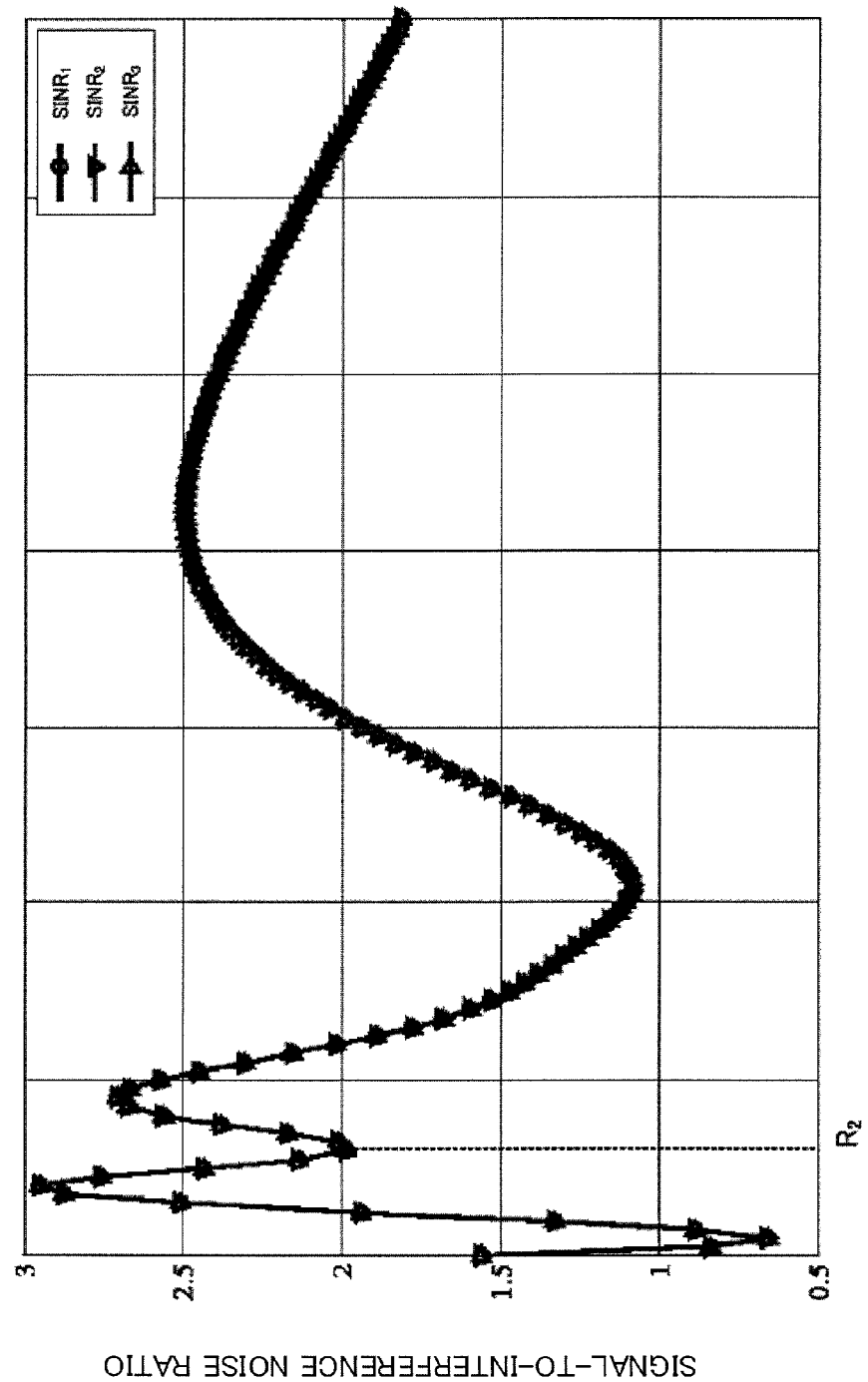
FIG. 19 is a graph illustrating an example of a relation between a signal-to-interference noise ratio and an inter-center distance of a circle on which transmission and reception antennas are arranged according to the fourth embodiment.

For example, a case in which the plurality of transmission antennas 11 and the plurality of reception antennas 21 are arranged such that the offset angle θ is 45° is considered. In this case, as illustrated in FIG. 19, when the inter-center distance R is the distance $R_2$, the signal-to-interference plus noise ratio $SINR_p$ is larger than 0. Thus, it is possible to increase the channel capacity when the inter-center distance R is the distance $R_2$. As described above, by changing the offset angle θ, it is possible to adjust the signal-to-interference plus noise ratio $SINR_p$ when the inter-center distance R is the certain distance $R_2$.

In the radio communication system 1F, when the signal-to-interference plus noise ratios are different among the reception antennas 21, the spatial interleaving may be executed.

In the radio communication system 1F, the MMSE technique may be used instead of the ZF technique.

When the MMSE technique is used, the filter matrix $G_{MMSE}$ is expressed as in Mathematical Formula 81 derived from Mathematical Formula 58 and Mathematical Formulas 78 to 80:

$$H_{cir} = F\Psi F^H \quad \text{[Mathematical Formula 78]}$$

$$F^H F = FF^H = 1 \quad \text{[Mathematical Formula 79]}$$

$$F^{-1} = F^H \quad \text{[Mathematical Formula 80]}$$

$$\begin{aligned} G_{MMSE} &= (H_{cir}^H H_{cir} + \gamma I)^{-1} H_{cir}^H \quad \text{[Mathematical Formula 81]} \\ &= (F\Psi^H F^H F\Psi F^H + \gamma I)^{-1} F\Psi^H F^H \\ &= (F\Psi^H \Psi F^H + F\gamma I F^H)^{-1} F\Psi^H F^H \\ &= [F(\Psi^H \Psi + \gamma I)F^H]^{-1} F\Psi^H F^H \\ &= [F(\psi_p^2 I + \gamma I)F^H]^{-1} F\Psi^H F^H \\ &= [F(\psi_p^2 + \gamma)I F^H]^{-1} F\Psi^H F^H \\ &= F^{-H}(\psi_p^2 + \gamma)^{-1} I F^{-1} F\Psi^H F^H \\ &= F^{-H}(\psi_p^2 + \gamma)^{-1} \psi_p^* I F^H \\ &= F\text{diag}\left(\frac{\psi_p^*}{\psi_p^2 + \gamma}\right) F^H \end{aligned}$$

$\psi_p^*$ represents a complex conjugate of the diagonal element $\psi_p$ of the diagonal matrix $\psi$. $\text{diag}(X_p)$ represents a diagonal matrix having $X_p$ as an element of a p-th row and a p-th column.

Thus, when the MMSE technique is used, the estimation value $x_e$ of the transmission signal x is expressed as in Mathematical Formula 82.

$$x_e = G_{MMSE} y = F\text{diag}\left(\frac{\psi_p^*}{\psi_p^2 + \gamma}\right) F^H y \quad \text{[Mathematical Formula 82]}$$

Figure 20:
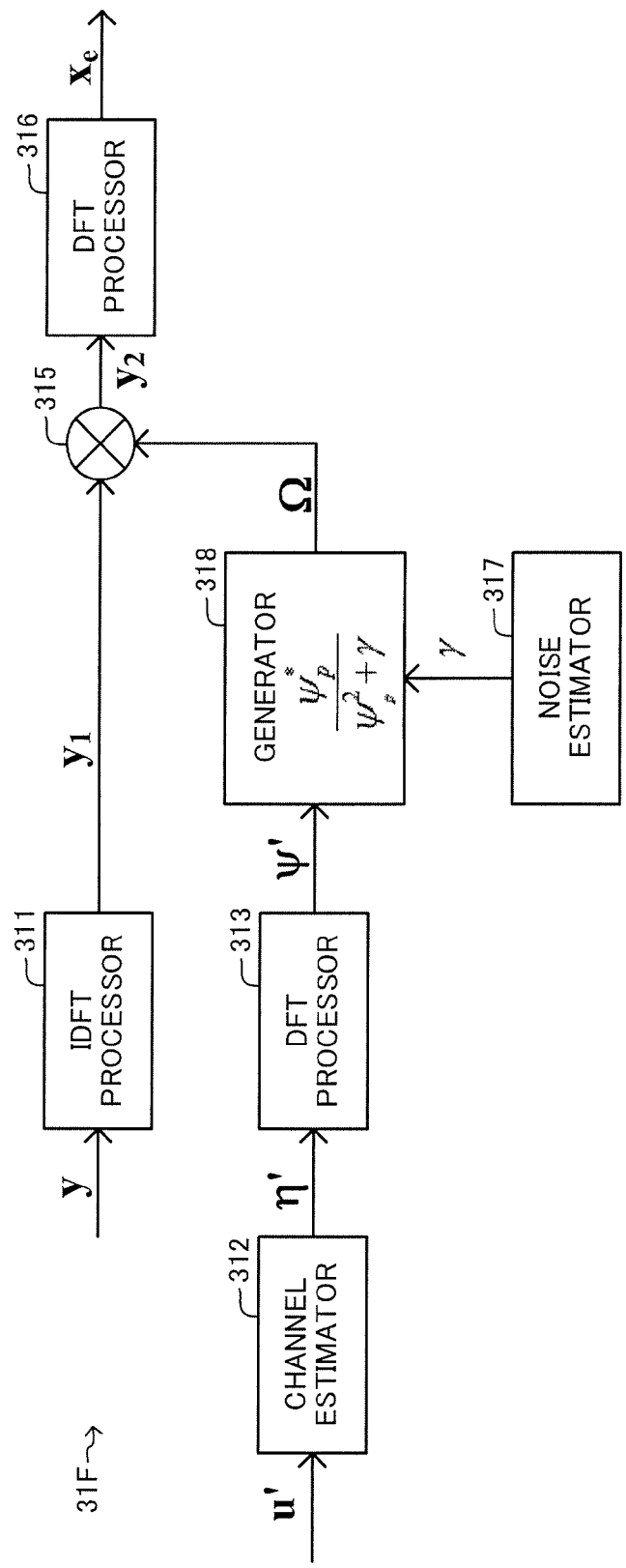
FIG. 20 is a view illustrating an example of a configuration of a MIMO detector illustrated in FIG. 15.

In this case, as illustrated in FIG. 20, the MIMO detector 31F includes a noise estimator 317 and a generator 318 instead of the generator 314 of FIG. 16 as an example.

The noise estimator 317 estimates a noise parameter γ, and outputs the estimated noise parameter γ to the generator 318. In this example, the noise parameter γ is calculated as in Mathematical Formula 83. ρ represents an average value of SNRs on all the reception antennas 21.

$$\gamma = \frac{N}{\rho} \quad \text{[Mathematical Formula 83]}$$

The generator 318 generates a diagonal matrix Ω based on the diagonal element vector ψ' output from the DFT processor 313 and the noise parameter γ output from the noise estimator 317. The diagonal element $\omega_p$ that is an element of a p-th row and a p-th column of the diagonal matrix Ω is calculated as in Mathematical Formula 84. The generator 318 outputs the generated diagonal matrix Ω to the multiplier 315. The diagonal matrix Ω is an example of the first diagonal matrix.

$$\omega_p = \frac{\psi_p^*}{\psi_p^2 + \gamma} \quad \text{[Mathematical Formula 84]}$$

In the radio communication system 1F, even when the MMSE technique is used, similarly to when the ZF technique is used, the IDFT is executed on the reception signal, and the execution result is pre-multiplied by the diagonal matrix Ω. Further, in the radio communication system 1F, the transmission signal x transmitted through the plurality of transmission antennas 11 is estimated by executing the DFT on the multiplication result. Accordingly, the amount of computation for estimating the transmission signal x can be reduced.

The radio communication system 1F may include the acquisitor 201 and the adjuster 202 of FIG. 13. In this case, in the radio communication system 1F, information representing the channel capacity is acquired, the position of at least one of the plurality of reception antennas 21 and the plurality of transmission antennas 11 may be adjusted based on the acquired information. As a result, it is possible to reliably increase the channel capacity.

First Modified Example of Fourth Embodiment

Figure 21:
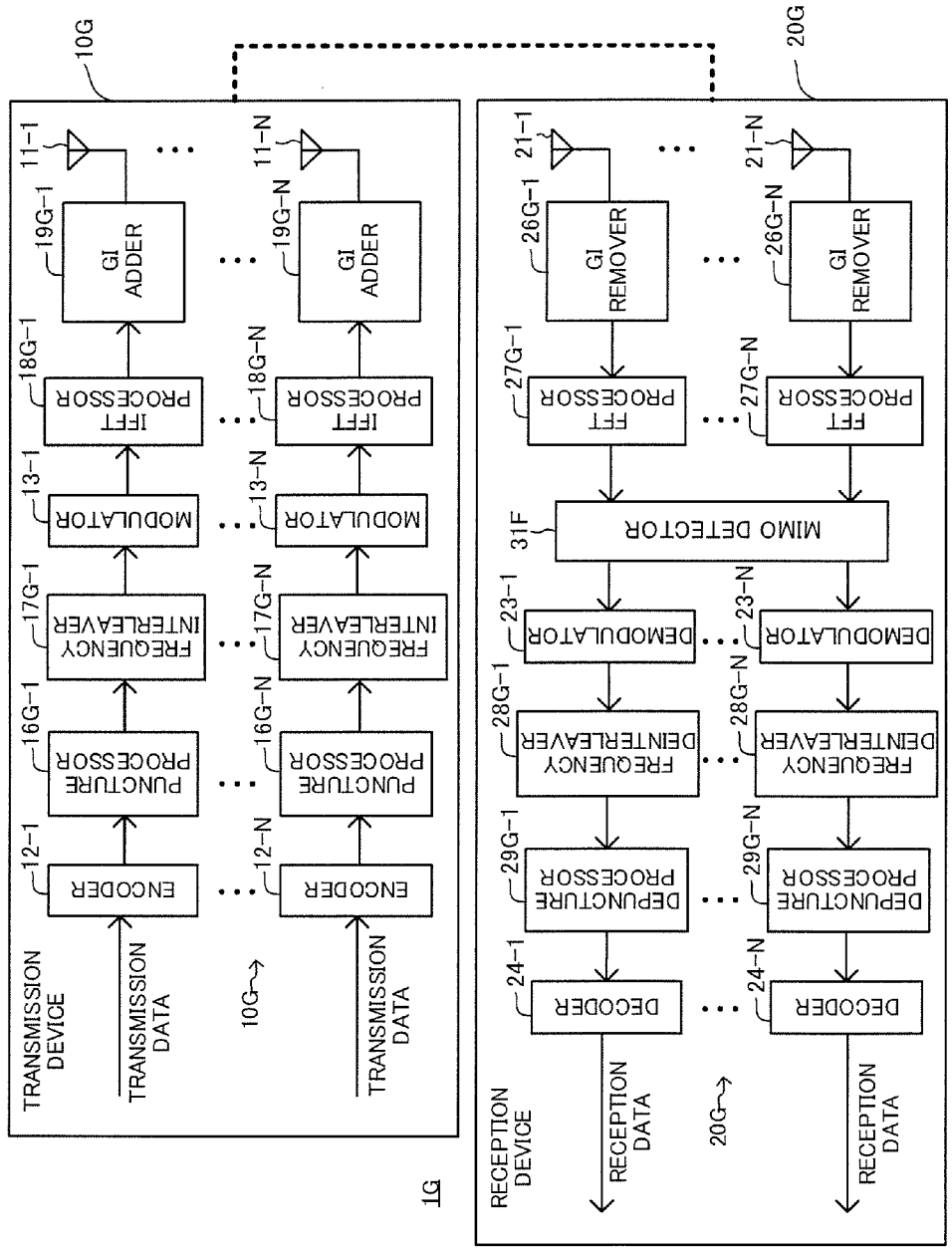
FIG. 21 is a view illustrating a configuration of a radio communication system according to a first modified example of the fourth embodiment.

Next, a radio communication system according to a first modified example of the fourth embodiment will be described. The radio communication system according to the first modified example of the fourth embodiment is different from the radio communication system according to the fourth embodiment in that multi-carrier transmission is performed. Hereinafter, the difference will be mainly described. In the description of the first modified example of the fourth embodiment, elements having the same reference numerals as those used in the fourth embodiment are the same as or almost the same as those in the fourth embodiment As illustrated in FIG. 21, a radio communication system 1G according to the first modified example includes a transmission device 10G and a reception device 20G instead of the transmission device 10F and the reception device 20F of FIG. 15.

In the radio communication system 1G, multi-carrier transmission in which a radio signal is transmitted through a plurality of sub carriers having a plurality of different frequencies is performed. In this example, the radio communication system 1G performs the multi-carrier transmission according to the OFDM scheme.

The transmission device 10G includes a plurality of (N, in this example) puncture processors 16G-1, ..., and 16G-N and a plurality of (N, in this example) frequency interleavers 17G-1, ..., and 17G-N in addition to the configuration of the transmission device 10F. of FIG. 15. Further, the transmission device 10G includes a plurality of (N, in this example) IFFT processors 18G-1, ..., and 18G-N and a plurality of (N, in this example) GI adders 19G-1, ..., and 19G-N.

The puncture processor 16G-i (i represents an integer from 1 to N) is referred to simply as a "puncture processor 16G" when the puncture processors need not be distinguished from each other. Similarly, the frequency interleaver 17G-i, the IFFT processor 18G-i and the GI adder 19G-i are also referred to simply as a "frequency interleaver 17G", an "IFFT processor 18G", and a "GI adder 19G", respectively.

The puncture processor 16G executes the rate matching on the transmission data output from the encoder 12, similarly to the puncture processor 16B of FIG. 11. The puncture processor 16G outputs the transmission data after the execution to the frequency interleaver 17G.

The frequency interleaver 17G executes the frequency interleaving on the transmission data output from the puncture processor 16G, similarly to the frequency interleaver 17B of FIG. 11. The frequency interleaver 17G outputs the transmission data after the execution to the modulator 13.

The IFFT processor 18G converts the plurality of the transmission signals output from the modulators 13 from the frequency domain to the time domain, similarly to the IFFT processor 18B of FIG. 11. The IFFT processor 18G outputs the converted transmission signals to the GI adder 19G.

The GI adder 19G adds the GI to the transmission signals output from the IFFT processor 18G, similarly to the GI adder 19B of FIG. 11. The GI adder 19G outputs the transmission signals after the addition to the transmission antenna 11.

The reception device 20G includes a plurality of (N, in this example) GI removers 26G-1, ..., and 26G-N and a plurality of (N, in this example) FFT processors 27G-1, ..., and 27G-N in addition to the configuration of the reception device 20F of FIG. 15. Further, the reception device 20G includes a plurality of (N, in this example) frequency deinterleavers 28G-1, ..., and 28G-N and a plurality of (N, in this example) depuncture processors 29G-1, ..., and 29G-N.

The GI remover 26G-i (i represents an integer from 1 to N) is referred to simply as a "GI remover 26G" when the GI removers need not be distinguished from each other. Similarly, the FFT processor 27G-i, the frequency deinterleaver 28G-i and the depuncture processor 29G-i are also referred to simply as an "FFT processor 27G", a "frequency deinterleaver 28G", and a "depuncture processor 29G", respectively.

The GI remover 26G removes the GI from the reception signal received through the reception antenna 21, similarly to the GI remover 26B of FIG. 11. The GI remover 26G outputs the reception signal after the removal to the FFT processor 27G.

The FFT processor 27G converts the reception signal output from the GI remover 26G from the time domain to the frequency domain, similarly to the FFT processor 27B of FIG. 11. The FFT processor 27G outputs the converted reception signal to the MIMO detector 31F.

The MIMO detector 31F executes the MIMO detection on the reception signal output from the FFT processor 27G, and outputs the execution result of the MIMO detection to the demodulator 23.

The frequency deinterleaver 28G executes the frequency deinterleaving on the reception data output from the demodulator 23, similarly to the frequency deinterleaver 28B of FIG. 11. The frequency deinterleaver 28G outputs the reception data after the execution to the depuncture processor 29G.

The depuncture processor 29G executes the de-rate matching on the reception data output from the frequency deinterleaver 28G, similarly to the depuncture processor 29B of FIG. 11. The depuncture processor 29G outputs the reception data after the execution to the decoder 24.

The processes executed in the radio communication system 1F are executed in the radio communication system 1G for each of sub carriers in parallel. Thus, in this example, the MIMO detector 31F executes the MIMO detection for each sub carrier.

As described above, in the radio communication system 1G according to the first modified example, the amount of computation for estimating the transmission signal x can be reduced for each sub carrier.

The radio communication system 1G may include the acquisitor 201 and the adjuster 202 of FIG. 13. In this case, in the radio communication system 1G, information representing the channel capacity is acquired, and the position of at least one of the plurality of reception antennas 21 and the plurality of transmission antennas 11 may be adjusted based on the acquired information. As a result, it is possible to reliably increase the channel capacity.

Second Modified Example of Fourth Embodiment

Next, a radio communication system according to a second modified example of the fourth embodiment will be described. The radio communication system according to the second modified example of the fourth embodiment is different from the radio communication system according to the fourth embodiment in that a complex conjugate transposed matrix of a channel matrix is used as a filter matrix. Hereinafter, the difference will be mainly described. In the description of the second modified example of the fourth embodiment, elements having the same reference numerals as those used in the fourth embodiment are the same as or almost the same as those in the fourth embodiment.

Figure 22:
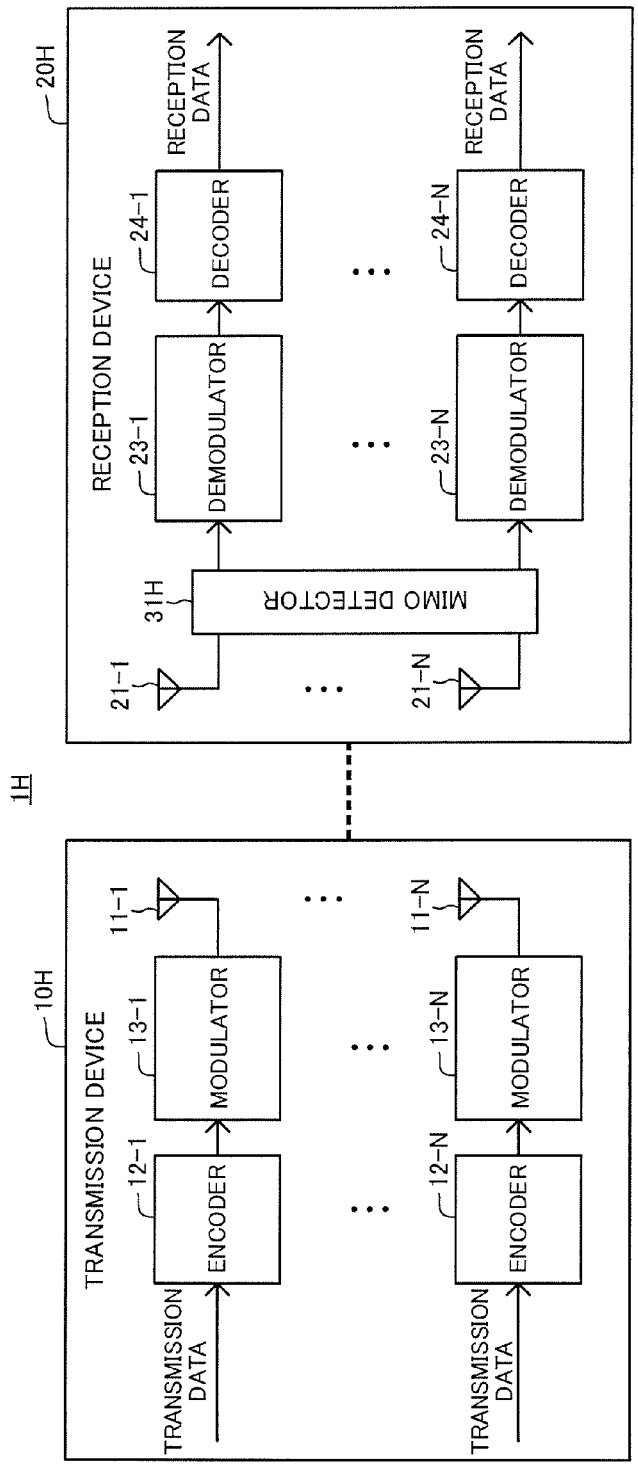
FIG. 22 is a view illustrating a configuration of a radio communication system according to a second modified example of the fourth embodiment.

As illustrated in FIG. 22, a radio communication system 1H according to the second modified example includes a transmission device 10H and a reception device 20H instead of the transmission device 10F of FIG. 15 and the reception device 20F of FIG. 15. The reception device 20H includes a MIMO detector 31H instead of the MIMO detector 31F of FIG. 15.

In this example, in the radio communication system 1H, the plurality of transmission antennas 11 and the plurality of reception antennas 21 are arranged such that the inter-center distance R, the diameter $d_t$ of the first circle C1, and the diameter $d_r$ of the second circle C2 satisfy the relation expressed by Mathematical Formula 51. In the radio communication system 1H, when the number N of antennas is 2, the plurality of transmission antennas 11 and the plurality of reception antennas 21 may be arranged such that the relation expressed by Mathematical Formula 52 is satisfied.

In this case, a correlation between two columns of the channel matrix $H_{cir}$ sufficiently approaches 0, and thus the channel matrix $H_{cir}$ is sufficiently close to an orthogonal matrix. Thus, in this case, the inverse matrix $H_{cir}^{-1}$ of the channel matrix $H_{cir}$ is sufficiently close to a complex conjugate transposed matrix $H_{cir}^H$ of the channel matrix $H_{cir}$.

Thus, in this example, the MIMO detector 31H calculates the estimation value $x_e$ of the transmission signal x as in Mathematical Formula 85.

$$x_e = H_{cir}^H y \qquad \text{[Mathematical Formula 85]}$$

The MIMO detector 31H calculates the estimation value $\eta_p$ of the channel response based on the reception signal $u_p'$ and the known transmission signal $u_0$ being held in advance for each of the plurality of reception antennas 21, similarly to the channel estimator 312 of FIG. 16. Then, the MIMO detector 31H calculates the complex conjugate transposed matrix $H_{cir}^H$ of the channel matrix $H_{cir}$ based on the calculated estimation value $\eta_p$ of the channel response. Then, the MIMO detector 31H calculates the estimation value $x_e$ of the transmission signal x by pre-multiplying the reception signal y by the calculated complex conjugate transposed matrix $H_{cir}^H$ of the channel matrix $H_{cir}$.

As described above, in the radio communication system 1H according to the second modified example of the fourth embodiment, the transmission signal $x_e$ transmitted through the plurality of transmission antennas 11 is estimated based on the reception signal y, the complex conjugate transposed matrix $H_{cir}^H$ of the channel matrix $H_{cir}$, and Mathematical Formula 85.

Accordingly, the transmission signal x can be estimated at a sufficiently high degree of accuracy. Further, the amount of computation for estimating the transmission signal x can be reduced.

In addition, in the radio communication system 1H, the complex conjugate transposed matrix $H_{cir}^H$ of the channel matrix $H_{cir}$ is estimated based on the reception signals obtained by receiving the known transmission signal, which is transmitted through one transmission antenna 11-1, through the plurality of reception antennas 21.

Accordingly, the transmission signal x can be estimated by estimating the channel responses between one transmission antenna 11-1 and the plurality of reception antennas 21. Thus, the amount of computation for estimating the transmission signal x can be reduced to be smaller than when the channel responses between the plurality of transmission antennas 11 and the plurality of reception antennas 21 are estimated.

In the radio communication system 1H, the multi-carrier transmission may be performed, similarly to the radio communication system 1G according to the first modified example of the fourth embodiment.

The radio communication system 1H may include the acquisitor 201 and the adjuster 202 of FIG. 13. In this case, in the radio communication system 1H, information representing the channel capacity is acquired, and the position of at least one of the plurality of reception antennas 21 and the plurality of transmission antennas 11 may be adjusted based on the acquired information. As a result, it is possible to reliably increase the channel capacity.

In each of the radio communication systems according to the above embodiments, communication is performed in one direction, but communication may be performed in two directions between communication devices. In this case, the communication device may have the functions of both the transmission device and the reception device.

In each of the radio communication systems according to the above embodiments, adaptive modulation and transmission power distribution may be performed.

Each of the radio communication systems according to the above embodiments may be applied to communication in a mesh network, communication between base stations, communication via a backhaul line, relay communication, communication between radio access points, communication for relaying a moving picture, and the like. Each of the radio communication systems according to the above embodiments may be applied to communication between boards mounted on computers.

Figure 23:
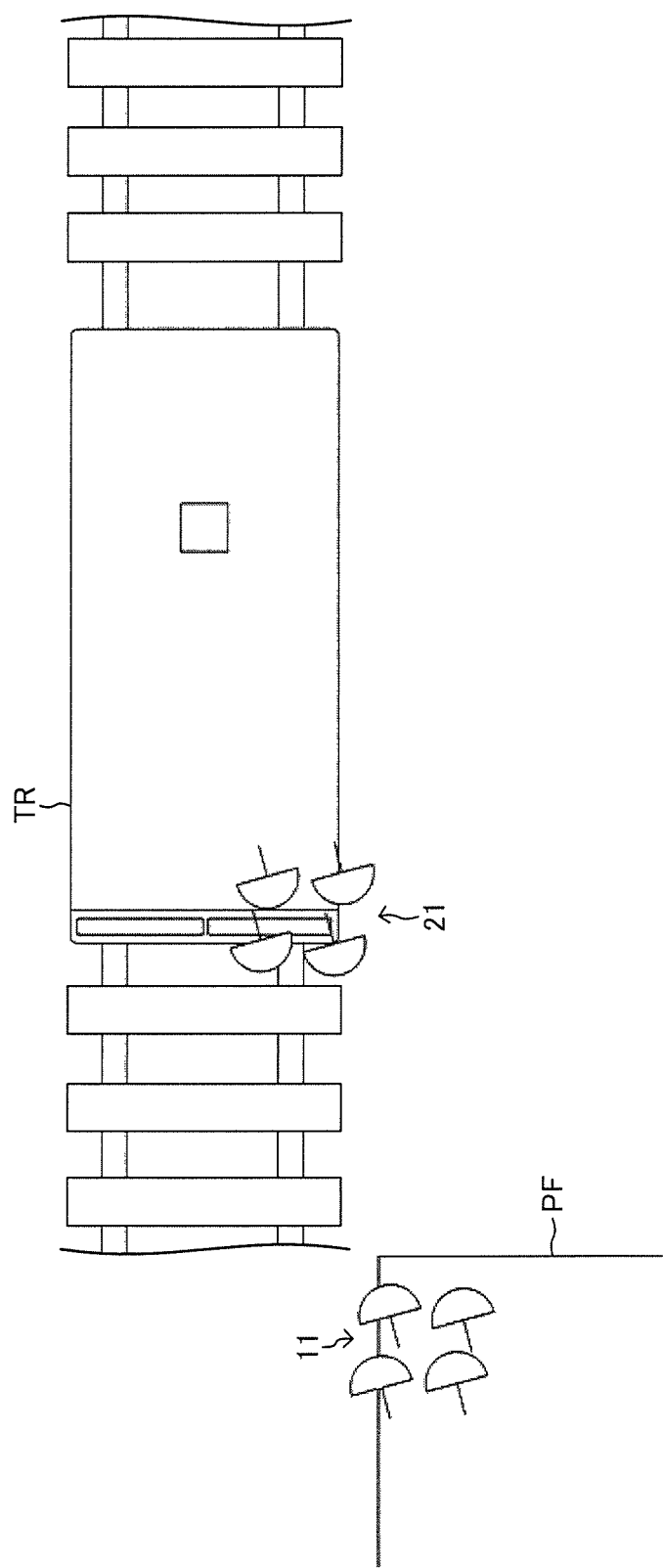
FIG. 23 is an explanatory view schematically illustrating an exemplary application of a radio communication system.

In each of the radio communication systems according to the above embodiments, at least one of the transmission device and the reception device may be mounted in a mobile object. For example, as illustrated in FIG. 23, the transmission antenna 11 of the transmission device may be installed at a platform PF of a train station, and the reception antenna 21 of the reception device may be mounted on an electric train TR.

In this case, communication is performed during a period of time in which the plurality of transmission antennas 11 and the plurality of reception antennas 21 are arranged such that the channel matrix substantially matches the circulant matrix as the electric train TR moves. For example, information held in the electric train TR may be transferred, and the information may be displayed on a display installed on the platform PF. The reception antenna 21 of the reception device may be installed at the platform PF of the train station, and the transmission antenna 11 of the transmission device may be mounted in the electric train TR.

Further, an arbitrary combination of the above embodiments and the modified examples may be employed as another modified example of the above embodiments in a range not departing from the gist of the present invention.

According to an aspect of the above embodiments, a communication process using a plurality of transmission antennas and a plurality of reception antennas can be simplified.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication system in which signals are transmitted from a plurality of transmission antennas to a plurality of reception antennas, and the plurality of transmission antennas are arranged on a circumference of a first circle and the plurality of reception antennas are arranged on a circumference of a second circle that is parallel and concentric to the first circle such that a channel matrix H having channel responses between the plurality of transmission antennas and the plurality of reception antennas as elements is a circulant matrix.

2. The radio communication system according to claim 1, wherein a signal obtained by multiplying a pre-process signal by a transmission weight matrix, which is a matrix F that is set such that a relation expressed in Mathematical Formula 86 is satisfied between the channel matrix H and a diagonal matrix $\psi$ or which is a matrix acquired by rearranging columns of the matrix F, is transmitted from the plurality of transmission antennas as a transmission signal, $$\psi = F^H HF,  \quad \text{[Mathematical Formula 86]}$$

wherein $F^H$ is a complex conjugate transposed matrix of the transmission weight matrix F; and wherein a post-process signal is obtained by multiplying a reception signal received by the plurality of antennas by a reception weight matrix, which is a complex conjugate transposed matrix $F^H$ of the transmission weight matrix F.

3. The radio communication system according to claim 2, wherein an element $f_{mn}$ of the m-th row and the n-th column of the transmission weight matrix F is determined by an expression in Mathematical Formula 87, $$f_{mn} = \frac{1}{\sqrt{N}} \exp\left(-\frac{2\pi}{N} j(m-1)(n-1)\right), \quad \text{[Mathematical Formula 87]}$$

where N represents a number of the plurality of transmission antennas, and j represents an imaginary unit.

4. The radio communication system according to claim 3, wherein the pre-process signal is multiplied by the transmission weight matrix F by performing a fast Fourier transform.

5. The radio communication system according to claim 3, wherein the reception signal is multiplied by the reception weight matrix $F^H$ by performing a fast Fourier transform.

6. The radio communication system according to claim 1, wherein an error correction code is added to each of a plurality of stream signals, spatial interleaving is performed on the plurality of stream signals after the addition of the error correction code, and the plurality of stream signals after the spatial interleaving are transmitted from the plurality of transmission antennas.

7. The radio communication system according to claim 1, wherein a transmission signal $x_e$ transmitted from the plurality of transmission antennas is estimated by performing an inverse discrete Fourier transform for a reception signal y received by the plurality of reception antennas, multiplying a result of the inverse discrete Fourier transform by a first diagonal matrix $\Omega$, and performing a discrete Fourier transform on a result of the multiplication.

8. The radio communication system according to claim 7, wherein the discrete Fourier transform and the inverse discrete Fourier transform are performed by using a fast Fourier transform.

9. The radio communication system according to claim 7, wherein the transmission signal $x_e$ is estimated based on a matrix F, a complex conjugate transposed matrix $F^H$ of the matrix F, the reception signal y, the first diagonal matrix SI, such that a relation expressed in Mathematical Formula 89 is satisfied, $$x_e = F\Omega F^H y, \text{ and} \quad \text{[Mathematical Formula 89]}$$

wherein the matrix F and the complex conjugate transposed matrix $F^H$ are set such that a relation between the channel matrix H and a second diagonal matrix $\psi$ is satisfied in accordance with Mathematical Formula 86, $$\psi = F^H HF \quad \text{[Mathematical Formula 86]}.$$

10. The radio communication system according to claim 9, wherein an element $\omega_p$ of the p-th row and the p-th column of the first diagonal matrix $\Omega$ is determined in accordance with Mathematical Formula 90, and $\psi_p$ represents an element of the p-th row and the p-th column of the second diagonal matrix $\psi$, $$\omega_p = \frac{1}{\psi_p}. \quad \text{[Mathematical Formula 90]}$$

11. The radio communication system according to claim 9, wherein an element $\omega_p$ of the p-th row and the p-th column of the first diagonal matrix $\Omega$ is determined according to Mathematical Formula 91, $$\omega_p = \frac{\psi_p^*}{\psi_p^2 + \gamma}, \quad \text{[Mathematical Formula 91]}$$

$\psi_p$ represents an element of the p-th row and the p-th column of the second diagonal matrix $\psi$, $\psi_p^*$ represents a complex conjugate of the element $\psi_p$, and $\gamma$ represents a noise.

12. The radio communication system according to claim 1, wherein the plurality of transmission antennas and the plurality of reception antennas are arranged such that a correlation between two columns of the channel matrix H approaches zero.

13. The radio communication system according to claim 12,
wherein the plurality of transmission antennas are arranged on a circumference of a first circle,
wherein the plurality of reception antennas are arranged on a circumference of a second circle that is parallel and concentric to the first circle, and
wherein the plurality of transmission antennas and the plurality of reception antennas are arranged such that a relation among a distance R between a center of the first circle and a center of the second circle, a diameter $d_t$ of the first circle, and a diameter $d_r$ of the second circle satisfies an expression of Mathematical Formula 92, $$d_t d_r = \frac{2}{\sin^2(\pi/N)} \frac{\lambda R}{N}, \quad \text{[Mathematical Formula 92]}$$

where N represents the number of the plurality of transmission antennas, and X represents a wavelength of a carrier wave of a signal transmitted from the plurality of transmission antennas.

14. The radio communication system according to claim 12, wherein a transmission signal $x_e$ transmitted from the plurality of transmission antennas is estimated based on a signal y received by the plurality of reception antennas, a complex conjugate transposed matrix $H^H$ of the channel matrix H, according to Mathematical Formula 93, $$x_e = H^H y \quad \text{[Mathematical Formula 93]}.$$

15. The radio communication system according to claim 1, comprising:
an acquisitor configured to acquire information that represents a channel capacity between the plurality of transmission antennas and the plurality of reception antennas; and
an adjuster configured to adjust a position of at least one of the plurality of transmission antennas and the plurality of reception antennas based on the acquired information.

16. The radio communication system according to claim 1, wherein when the channel matrix H changes from the circulant matrix to a matrix different from the circulant matrix, multi-input multi-output (MIMO) signal separation and detection are performed using a zero-forcing (ZF) technique or a minimum mean square error (MMSE) technique.

17. The radio communication system according to claim 1, wherein the radio communication system comprises a communication system for fixed wireless access or for line of sight (LOS) communication.

18. The radio communication system according to claim 2, wherein elements of the matrix F are set to constant values independent of a channel condition.

19. A radio communication method comprising:
when a plurality of transmission antennas are arranged on a circumference of a first circle and a plurality of reception antennas are arranged on a circumference of a second circle that is parallel and concentric to the first circle such that a channel matrix H having channel responses between the plurality of transmission antennas and the plurality of reception antennas as elements of the channel matrix H is a circulant matrix,
transmitting a signal from the plurality of transmission antennas by radio; and
receiving the transmitted signal using the plurality of reception antennas.

20. The radio communication method according to claim 19,
wherein a signal obtained by multiplying a pre-process signal by a transmission weight matrix, which is a matrix F that is set such that a relation between the channel matrix H and a diagonal matrix $\psi$ satisfies an expression in Mathematical Formula 86 or which is a matrix obtained by rearranging columns of the matrix F, is transmitted from the plurality of transmission antennas as a transmission signal, $$\psi = F^H H F \quad \text{[Mathematical Formula 86],}$$

where a matrix $F^H$ is a complex conjugate transposed matrix of the matrix F, and
wherein a post-process signal is obtained by multiplying a reception signal received by the plurality of antennas by a reception weight matrix, which is a complex conjugate transposed matrix $F^H$ of the transmission weight matrix F.

21. The radio communication method according to claim 19, wherein a transmission signal transmitted from the plurality of transmission antennas is estimated by performing an inverse discrete Fourier transform on a reception signal received by the plurality of reception antennas, multiplying a result of the inverse discrete Fourier transform by a first diagonal matrix, and performing a discrete Fourier transform on a result of the multiplication.

22. The radio communication method according to claim 19, wherein the radio communication system comprises a communication system for fixed wireless access or line of sight (LOS) communication.

23. The radio communication method according to claim 20, wherein elements of the matrix F are constant values independent of a channel condition.

24. A radio communication apparatus capable of supporting a multi-input multi-output (MIMO) scheme and for fixed wireless access, the radio communication apparatus comprising:
a plurality of transmission antennas arranged on a circumference of a first circle such that a channel matrix H having channel responses between the plurality of transmission antennas and a plurality of reception antennas as elements of the channel matrix H is a circulant matrix, the plurality of reception antennas being arranged on a circumference of a second circle that is parallel and concentric to the first circle; and
a processor coupled to the plurality of transmission antennas.

25. The radio communication apparatus according to claim 24, wherein the processor is configured to obtain a transmission signal by multiplying a pre-process signal by a transmission weight matrix F, such that a relation between the channel matrix H and a diagonal matrix $\psi$ is satisfied as follows:

$$\psi = F^H H F,$$

wherein F is the transmission weight matrix, and $F^H$ is a complex conjugate transposed matrix of the transmission weight matrix F; and
wherein elements of the transmission weight matrix F are constant independent of a channel condition.

* * * * *